(12) United States Patent
Li et al.

(10) Patent No.: US 11,072,874 B2
(45) Date of Patent: Jul. 27, 2021

(54) THREE-DIMENSIONAL STRUCTURES HAVING ADJUSTABLE AUXETIC EFFECTS

(71) Applicant: The University of New Hampshire, Durham, NH (US)

(72) Inventors: Yaning Li, Durham, NH (US); Yunyao Jiang, Durham, NH (US)

(73) Assignee: University of New Hampshire, Durham, NH (US)

( * ) Notice: Subject to any disclaimer, the term of this patent is extended or adjusted under 35 U.S.C. 154(b) by 171 days.

(21) Appl. No.: 15/959,630

(22) Filed: Apr. 23, 2018

(65) Prior Publication Data

US 2018/0237965 A1 Aug. 23, 2018

Related U.S. Application Data

(63) Continuation-in-part of application No. PCT/US2016/058450, filed on Oct. 24, 2016.

(60) Provisional application No. 62/245,533, filed on Oct. 23, 2015.

(51) Int. Cl.
| | | |
|---|---|---|
| *D04B 21/20* | (2006.01) | |
| *B32B 3/12* | (2006.01) | |
| *D04B 21/06* | (2006.01) | |
| *D04B 21/14* | (2006.01) | |
| *B32B 3/10* | (2006.01) | |

(52) U.S. Cl.
CPC .............. *D04B 21/20* (2013.01); *B32B 3/10* (2013.01); *B32B 3/12* (2013.01); *D04B 21/06* (2013.01); *D04B 21/14* (2013.01)

(58) Field of Classification Search
CPC ......... D04B 21/20; D04B 21/14; D04B 21/06

USPC ............................................................ 66/170
See application file for complete search history.

(56) References Cited

U.S. PATENT DOCUMENTS

| | | | |
|---|---|---|---|
| 8,652,602 B1 | 2/2014 | Dolla | |
| 2007/0162112 A1* | 7/2007 | Burriesci | A61F 2/2448 623/2.36 |
| 2008/0011021 A1* | 1/2008 | Starbuck | A43B 23/0205 66/170 |
| 2010/0029796 A1 | 2/2010 | Alderson et al. | |
| 2011/0029063 A1 | 2/2011 | Ma et al. | |

(Continued)

FOREIGN PATENT DOCUMENTS

| | | |
|---|---|---|
| CN | 108481821 B | 6/2019 |
| JP | 2010004965 A1 | 1/2010 |

OTHER PUBLICATIONS

Liu, Y. and Hu, H.; A review on auxetic structures and polymeric materials; May 18, 2020; Scientific Research and Essays; vol. 5, pp. 1052-1063 (Year: 2010).*

(Continued)

*Primary Examiner* — Tahseen Khan

(57) ABSTRACT

An auxetic polygonal cell may have a plurality of chiral structures capable of rotation. The plurality of chiral structures may at least partially enclose a volume. Each of the chiral structures may include a first cross member having a first set of distal ends and a second cross member intersecting the first cross member, the second cross member having a second set of distal ends. The chiral structures may also include a first set of legs, wherein each leg of the first set of legs extends from at least one distal end of the first set of distal ends and a second set of legs, wherein each leg of the second set of legs extends from at least one distal end of the second set of distal ends.

14 Claims, 19 Drawing Sheets

(56) References Cited

U.S. PATENT DOCUMENTS

| | | | | |
|---|---|---|---|---|
| 2011/0046715 A1* | 2/2011 | Ugbolue | ............... | D04B 21/12 |
| | | | | 623/1.15 |
| 2011/0282452 A1 | 11/2011 | Koerner et al. | | |
| 2012/0129416 A1 | 5/2012 | Anand et al. | | |
| 2012/0147351 A1 | 6/2012 | Jak et al. | | |
| 2013/0344601 A1 | 12/2013 | Soman et al. | | |
| 2014/0205795 A1* | 7/2014 | Hu | ........................... | B32B 3/12 |
| | | | | 428/116 |

OTHER PUBLICATIONS

International Search Report and Written Opinion, dated Dec. 29, 2016, received in related application PCT/US2016/058450, 8 pages.

Yanping Liu, et al., "A review on auxetic structures and polymeric materials", Scientific Research and Essays, Academic Journals, Nigeria, vol. 5, No. 10, (May 18, 2010), pp. 1052-1063.

Extended European Search Report regarding related EP Application 16840211.3, dated Apr. 29, 2019.

* cited by examiner

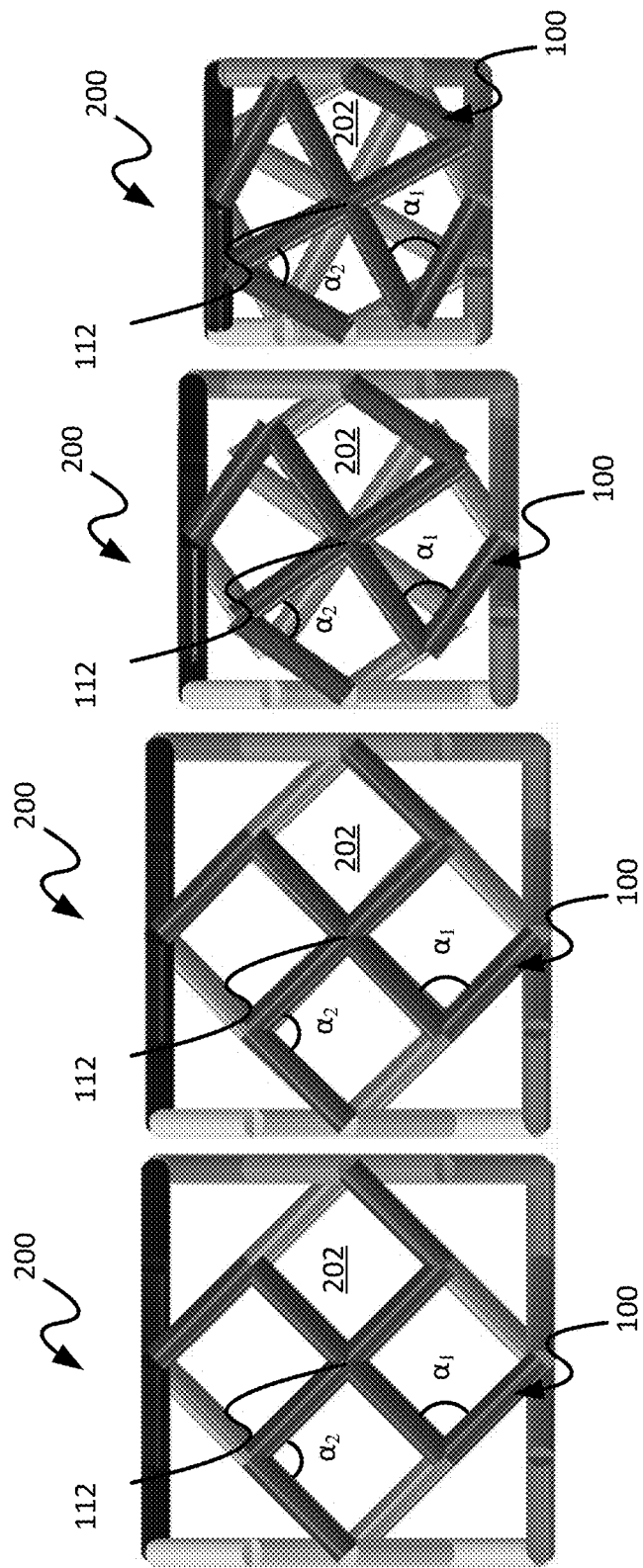

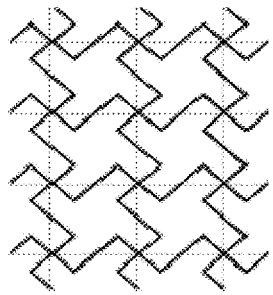
FIG. 14A
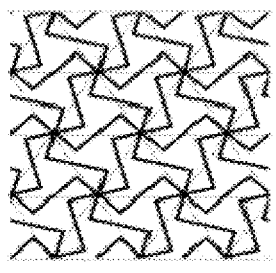
FIG. 14B
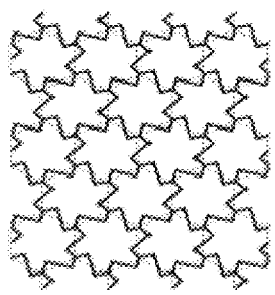
FIG. 14C
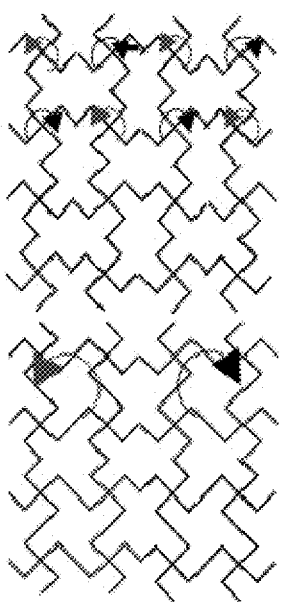
FIG. 15A
FIG. 15B
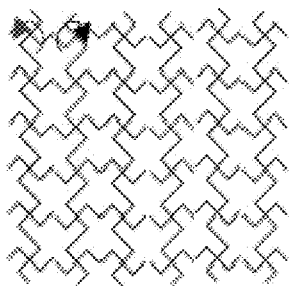
FIG. 15C
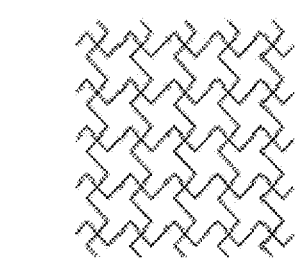
FIG. 16A
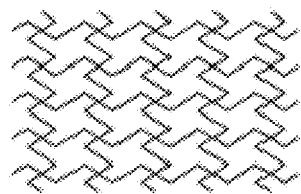
FIG. 16B
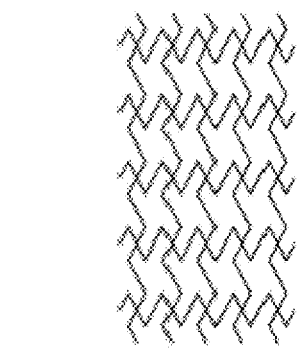
FIG. 16C

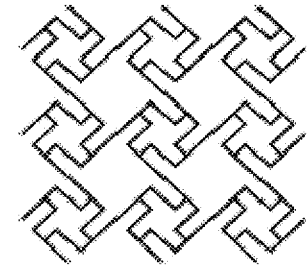
FIG. 17A
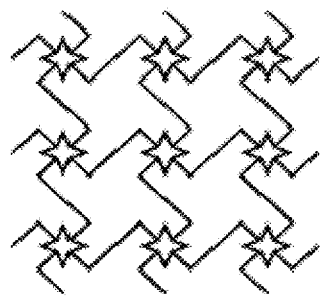
FIG. 17B
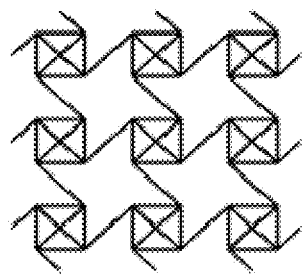
FIG. 17C
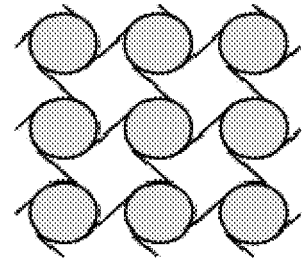
FIG. 18A
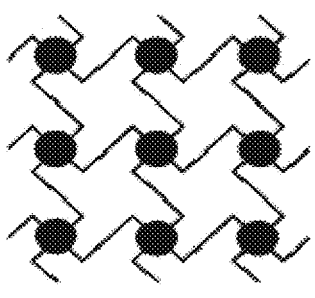
FIG. 18B
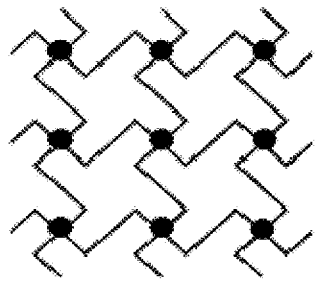
FIG. 18C
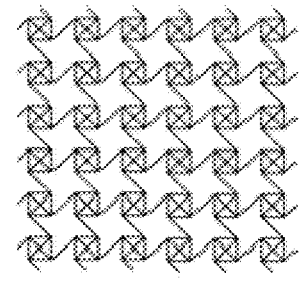
FIG. 19A
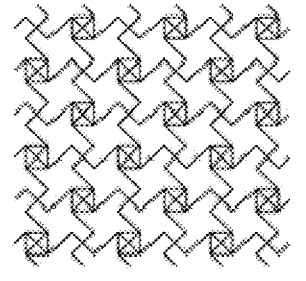
FIG. 19B
FIG. 19C

US 11,072,874 B2

THREE-DIMENSIONAL STRUCTURES HAVING ADJUSTABLE AUXETIC EFFECTS

CROSS-REFERENCE TO RELATED APPLICATIONS

This application is a continuation of International Application Number PCT/US2016/058450 filed Oct. 24, 2016, which claims benefit of U.S. Provisional Patent Application Ser. No. 62/245,533 filed on Oct. 23, 2015, which is fully incorporated herein in its entirety by reference.

TECHNICAL FIELD

The present disclosure relates to auxetic materials and more particularly to auxetic materials exhibiting auxetic properties (e.g., a negative Poisson's ratio) in multiple planes in response to the application of a force.

BACKGROUND INFORMATION

A material under tension or compression undergoes a change in length, width, and height. For example, for a tensile load, the ratio of the relative contraction strain (normal to the applied tensile force) to the relative extension strain (parallel to the applied force) is generally known as the Poisson's ratio. When a tensile force is applied to a material having a positive Poisson's ratio, the length and width of the material tends to decrease as the height of the material increases. Conversely, when a compressive force is applied to a material having a positive Poisson's ratio, the length and width of the material tends to increase as the height of the material decreases.

However, not all materials have a positive Poisson's ratio. Materials having a negative Poisson's ratio are commonly referred to as auxetic materials. For example, when a tensile force is applied to an auxetic material, as the height increases, at least one of the length and/or the width of the material tends to increase. Conversely, when a compressive force is applied to an auxetic material, as the height decreases at least one of the length and/or the width of the material tends to decrease.

SUMMARY

In an embodiment an auxetic polygonal cell may have a plurality of chiral structures capable of rotation. The plurality of chiral structures may at least partially enclose a volume. Each of the chiral structures may include a first cross member having a first set of distal ends and a second cross member intersecting the first cross member, the second cross member having a second set of distal ends. The chiral structures may also include a first set of legs, wherein each leg of the first set of legs extends from at least one distal end of the first set of distal ends and a second set of legs, wherein each leg of the second set of legs extends from at least one distal end of the second set of distal ends.

In an embodiment an auxetic periodic structure may have a plurality of cuboid cells coupled to each other. Each cuboid cell may include a plurality of chiral structures and may define a bounded volume. Each of the chiral structures may include a first cross member having a first set of distal ends and a second cross member intersecting the first cross member, the second cross member having a second set of distal ends. The chiral structures may also include a first set of legs, wherein each leg of the first set of legs extends from at least one distal end of the first set of distal ends and a second set of legs, wherein each leg of the second set of legs extends from at least one distal end of the second set of distal ends.

In an embodiment an auxetic cuboid cell may have at least six chiral structures that collectively define a bounded volume. Each of the chiral structures may include a first cross member having a first set of distal ends and a second cross member intersecting the first cross member, the second cross member having a second set of distal ends. The chiral structures may also include a first set of legs, wherein each leg of the first set of legs extends from at least one distal end of the first set of distal ends and a second set of legs, wherein each leg of the second set of legs extends from at least one distal end of the second set of distal ends.

BRIEF DESCRIPTION OF THE DRAWINGS

These and other features and advantages will be better understood by reading the following detailed description, taken together with the drawings, wherein:

FIG. 4A is a plan view of the cuboid cell of FIG. 2A, consistent with embodiments of the present disclosure.

FIG. 4B is a plan view of the cuboid cell of FIG. 3A, consistent with embodiments of the present disclosure.

FIG. 4C is a plan view of the cuboid cell of FIG. 3B, consistent with embodiments of the present disclosure.

FIG. 4D is a plan view of the cuboid cell of FIG. 3C, consistent with embodiments of the present disclosure.

FIG. 14A shows an example of a material having chiral structures that may define at least a portion of the tube-like structure of FIG. 13A, consistent with embodiments of the present disclosure.

FIG. 14B shows another example of a material having chiral structures that may define at least a portion of the tube-like structure of FIG. 13A, consistent with embodiments of the present disclosure.

FIG. 14C shows another example of a material having chiral structures that may define at least a portion of the tube-like structure of FIG. 13A, consistent with embodiments of the present disclosure.

FIG. 15A shows an example of a material having chiral structures capable of rotation in different directions that may define at least a portion of the tube-like structure of FIG. 13A, consistent with embodiments of the present disclosure.

FIG. 15B shows another example of a material having chiral structures capable of rotation in different directions that may define at least a portion of the tube-like structure of FIG. 13A, consistent with embodiments of the present disclosure.

FIG. 15C shows another example of a material having chiral structures capable of rotation in different directions that may define at least a portion of the tube-like structure of FIG. 13A, consistent with embodiments of the present disclosure.

FIG. 16A shows an example of a material having chiral structures that may define at least a portion of the tube-like structure of FIG. 13A, consistent with embodiments of the present disclosure.

FIG. 16B shows another example of a material having chiral structures that may define at least a portion of the tube-like structure of FIG. 13A, consistent with embodiments of the present disclosure.

FIG. 16C shows another example of a material having chiral structures that may define at least a portion of the tube-like structure of FIG. 13A, consistent with embodiments of the present disclosure.

FIG. 17A shows an example of a material having chiral structures with core cells that may define at least a portion of the tube-like structure of FIG. 13A, consistent with embodiments of the present disclosure.

FIG. 17B shows another example of a material having chiral structures with core cells that may define at least a portion of the tube-like structure of FIG. 13A, consistent with embodiments of the present disclosure.

FIG. 17C shows another example of a material having chiral structures with core cells that may define at least a portion of the tube-like structure of FIG. 13A, consistent with embodiments of the present disclosure.

FIG. 18A shows another example of a material having chiral structures with core cells that may define at least a portion of the tube-like structure of FIG. 13A, consistent with embodiments of the present disclosure.

FIG. 18B shows another example of a material having chiral structures with core cells that may define at least a portion of the tube-like structure of FIG. 13A, consistent with embodiments of the present disclosure.

FIG. 18C shows another example of a material having chiral structures with core cells that may define at least a portion of the tube-like structure of FIG. 13A, consistent with embodiments of the present disclosure.

FIG. 19A shows another example of a material having chiral structures with core cells that may define at least a portion of the tube-like structure of FIG. 13A, consistent with embodiments of the present disclosure.

FIG. 19B shows another example of a material having chiral structures with core cells that may define at least a portion of the tube-like structure of FIG. 13A, consistent with embodiments of the present disclosure.

FIG. 19C shows another example of a material having chiral structures with core cells that may define at least a portion of the tube-like structure of FIG. 13A, consistent with embodiments of the present disclosure.

DETAILED DESCRIPTION OF PREFERRED EMBODIMENTS

Figure 1:
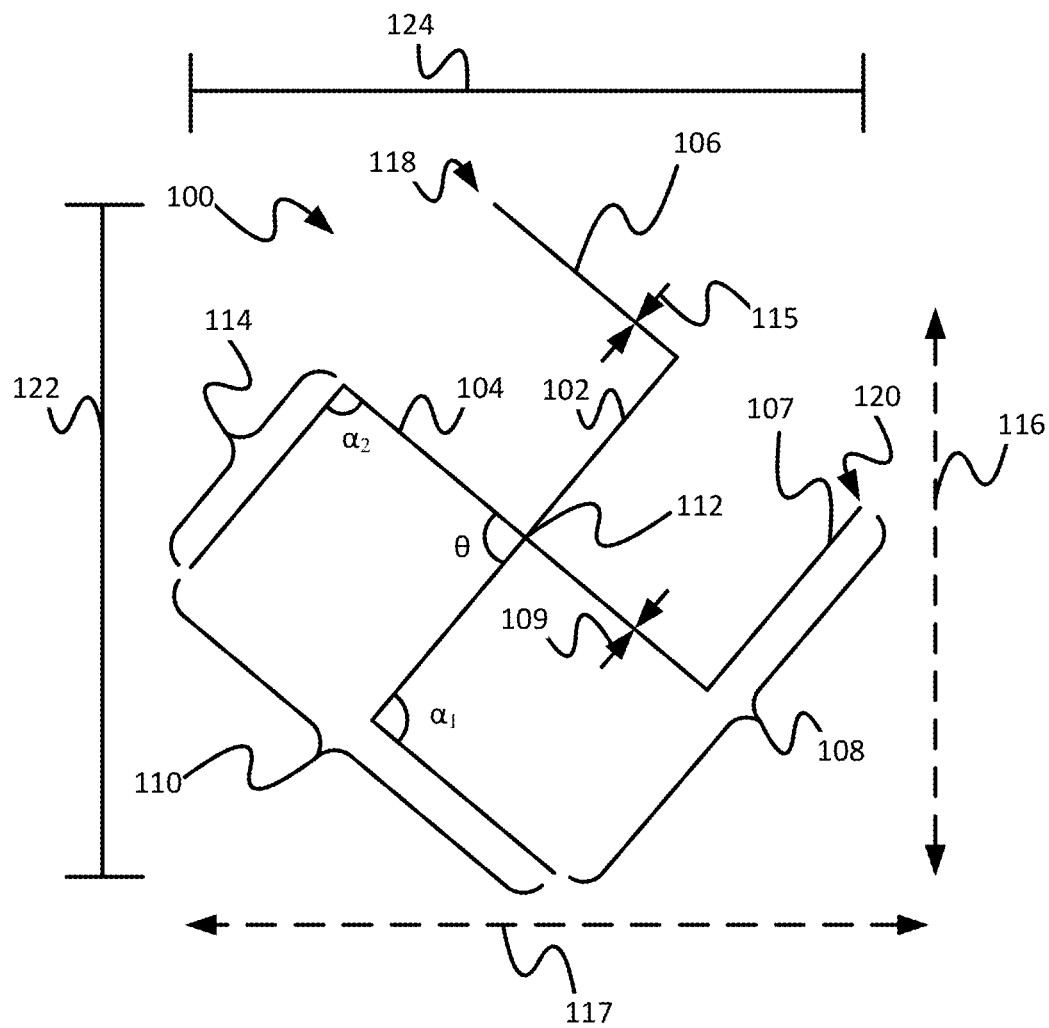
FIG. 1 is a schematic diagram of a chiral structure, consistent with embodiments of the present disclosure.

FIG. 1 shows a chiral structure 100. The chiral structure 100 may generally be described as being asymmetric about one or more axes such that the chiral structure 100 is not superimposable upon its mirror image. In some instances, the chiral structure 100 may not be symmetric about any axis.

When exposed to a force (e.g., a tensile and/or compressive force), the chiral structure 100 is capable of rotation in response to the application of the force. The rotation of the chiral structure 100 results in the chiral structure 100 exhibiting auxetic properties (e.g., a negative Poisson's ratio in one or more planes). In other words, the chiral structure 100 has a negative Poisson's ratio in at least one plane.

As shown, the chiral structure 100 includes a first cross member 102 and a second cross member 104, the second cross member 104 intersecting the first cross member 102. An intersection angle θ is formed at the intersection of the first and second cross members 102 and 104. The intersection angle θ may measure, for example, in a range of 30° to 120°. More specifically, for example, the intersection angle θ may measure in a range of 85° to 95°. Even more specifically, for example, the intersection angle θ may measure 90°.

The first cross member 102 may have a first cross member length 108 and the second cross member 104 may have a second cross member length 110. The first cross member length 108 may measure equal to the second cross member length 110. In these instances, the first and second cross members 102 and 104 intersect a midpoint 112. The midpoint 112 may correspond to a midpoint of the chiral structure 100, a midpoint of the first cross member 102, and a midpoint of the second cross member 104. Therefore, in these instances, the first and second cross members 102 and 104 may generally be described as forming an equilateral cross.

In some instances, for example, the first cross member length 108 may measure in a range of 100 micrometers (μm) to 100 millimeters (mm) and the second cross member length 110 may measure in a range of 100 μm to 100 mm. More specifically, for example, the first cross member length 108 may measure in a range of 100 μm to 10 mm and the second cross member length 110 may measure in a range of 100 μm to 10 mm. Even more specifically, for example, the first cross member length 108 may measure in a range of 100 μm to 1 mm and the second cross member length 110 may measure in a range of 100 μm to 1 mm. In some instances, for example, the first and second cross member lengths 108 and 110 may each measure 14 mm.

The first and second cross members 102 and 104 may each have a respective cross member width 109. The cross member width 109 may measure, for example, in a range of 10 μm to 10 mm. More specifically, for example, the cross member width 109 may measure in a range of 15 μm to 5 mm. Even more specifically, for example, the cross member width 109 may measure in a range of 20 μm to 1 mm. In some instances, for example, the cross member width 109 may measure 2 mm.

The chiral structure 100 may also include a first set of legs 106, wherein each leg of the first set of legs 106 extends from at least one distal end of a first set distal ends 111 of the first cross member 102, and a second set of legs 107, wherein each leg of the second set of legs 107 extends from at least one distal end of a second set distal ends 113 of the second cross member 104. For example, when the first set and second set of legs 106 and 107 each include two legs, each leg of the first and second sets of legs 106 and 107 may extend from a respective distal end of the first and second sets of distal ends 111 and 113 (e.g., opposing distal ends) of the first cross member 102 and the second cross member 104, respectively.

The first set of legs 106 may form a first leg angle $α_1$ with the first cross member 102 and the second set of legs 107 may form a second leg angle $α_2$ with the second cross member 104. The first and second leg angles $α_1$ and $α_2$ may measure, for example, in a range of 30° to 120°. More specifically, for example, the first and second leg angles $α_1$ and $α_2$ may measure in a range of 85° to 95°. Even more specifically, for example, the first and second leg angles $α_1$ and $α_2$ may measure 90°.

Each of the one or more legs in first and second sets of legs 106 and 107 may have a leg length 114. The leg length 114 may measure less than the first and/or second cross member length 108 and 110. For example, in some instances, the leg length 114 may measure half of the first and/or second cross member length 108 and 110. As such, the chiral structure 100 may be generally described as an equilateral cross having one or more legs extending therefrom.

In some instances, the leg length 114 may measure, for example, in a range of 50 μm to 50 mm. More specifically, for example, the leg length 114 may measure, for example, in a range of 50 μm to 5 mm. Even more specifically, for example, the leg length 114 may measure in a range of 50 μm to 0.5 mm.

Each leg in the first and second sets of legs may each have a leg width 115. The leg width 115 may measure, for example, in a range of 10 μm to 10 mm. More specifically, for example, the leg width 115 may measure in a range of 15 μm to 5 mm. Even more specifically, for example, the leg width 115 may measure in a range of 10 μm to 1 mm. In some instances, for example, the leg width 115 may measure 2 mm.

As shown, each of the first and second cross members 102 and 104 and each of the legs in the first and second set of legs 106 and 107 are transverse to a longitudinal axis 116 of the chiral structure 100. As such, the first cross member 102 and the first set of legs 106 may be generally described as forming a first "zig-zag" shaped segment 118 and the second cross member 104 and the second set of legs 107 may be generally described as forming a second "zig-zag" shaped segment 120. In some instances, the first "zig-zag" shaped segment 118 may extend along the longitudinal axis 116 and the second "zig-zag" shaped segment 120 may extend along a transverse axis 117 of the chiral structure 100.

When a compressive force is applied, for example, along the longitudinal axis 116, the first leg angle $α_1$ decreases in magnitude causing the second "zig-zag" shaped segment 120 to move and/or rotate relative to the midpoint 112. The movement and/or rotation of the second "zig-zag" shaped segment 120 results in an overall width 124 of the chiral structure 100 decreasing as an overall length 122 of the chiral structure 100 also decreases, for at least a portion of the deformation of the first "zig-zag" shaped segment 118. When a tensile force is applied, for example, along the longitudinal axis 116, the first leg angle $α_1$ increases in magnitude causing the second "zig-zag" shaped segment 120 to move and/or rotate relative to the midpoint 112. The movement and/or rotation of the second "zig-zag" shaped segment 120 results in the overall width 124 of the chiral structure 100 increasing as the overall length 122 of the chiral structure 100 also increases, for at least a portion of the deformation of the first "zig-zag" shaped segment 118. The deformation of the first "zig-zag" shaped segment 118 and the movement and/or rotation of the second "zig-zag" shaped segment 120 may collectively be referred to as a rotation of the chiral structure 100 relative to, for example, the midpoint 112. The rotation of the chiral structure 100 may generally result in the chiral structure 100 exhibiting auxetic properties for at least a portion of the rotation of the chiral structure 100.

In some instances, the overall length 122 may measure, for example, in a range of 140 μm to 140 mm and the overall width 124 may measure, for example, in a range of 100 inn to 100 mm. More specifically, for example, the overall length 122 may measure in a range of 140 μm to 70 mm and the overall width 124 may measure, for example, in a range of 100 μm to 10 mm. Even more specifically, for example, the overall length 122 may measure in a range of 140 μm to 3.5 mm and the overall width 124 may measure, for example, in a range of 100 μm to 1 mm. In some instances, for example, the overall length 122 and the overall width 124 may measure 20 and 14 mm, respectively.

Figure 2A:
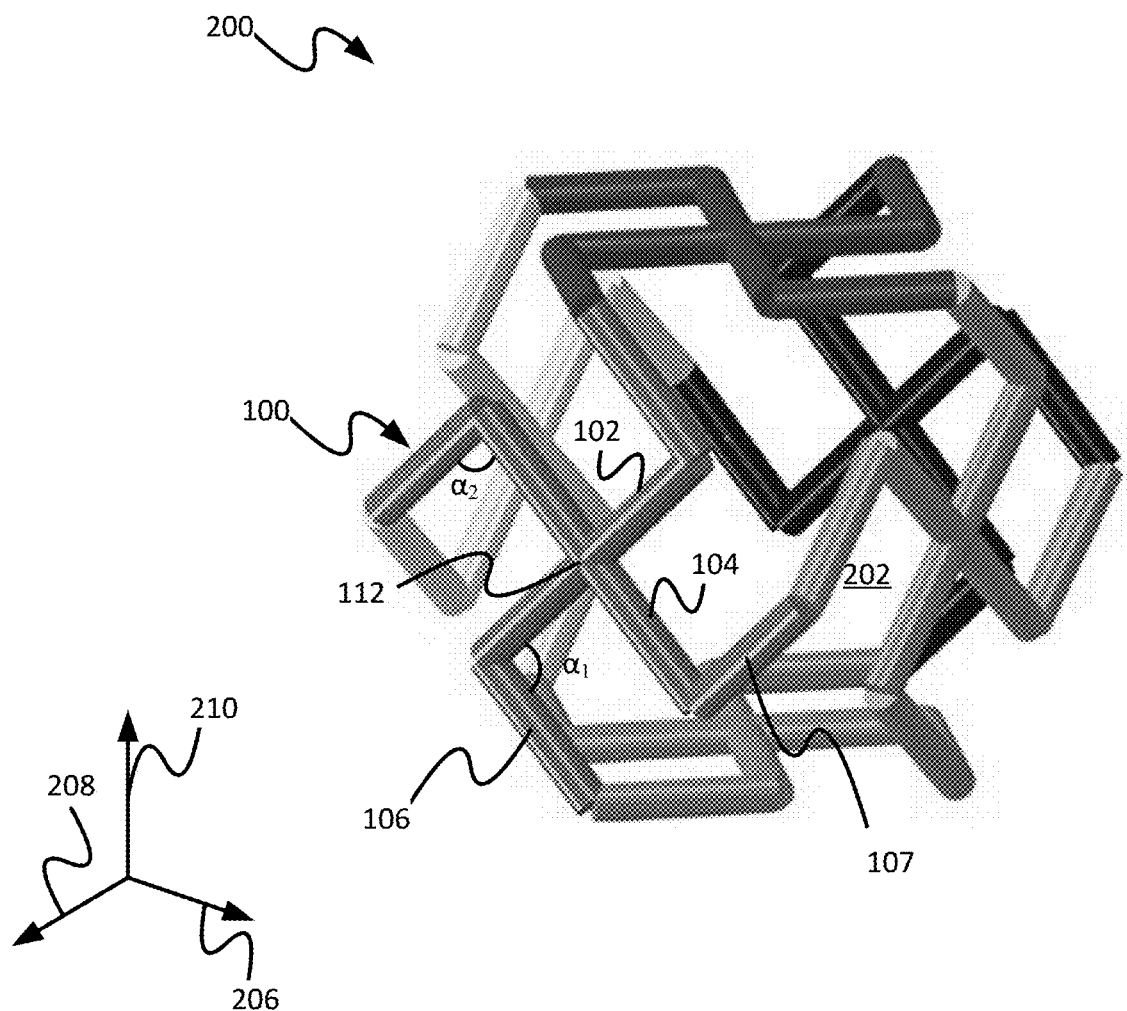
FIG. 2A is a perspective view of an example of a cuboid cell that is defined, at least in part, by the chiral structure of FIG. 1, consistent with embodiments of the present disclosure.

FIG. 2A shows a cuboid cell 200 including a plurality of chiral structures 100. As shown, the cuboid cell 200 at least partially encloses (and/or defines) a bounded volume 202, wherein each surface (or plane) of the cuboid cell 200 includes at least one chiral structure 100. The cross-members 102 and 104 and first and second sets of legs 106 and 107 provide a skeletal framework for the bounded volume 202. Therefore, the cuboid cell 200 (and/or the bounded volume 202) may generally be described as being defined, at least in part, by one or more chiral structures 100. Each of the chiral structures 100 may be connected (or coupled) to one or more adjacent chiral structures 100 using one or more legs in the first and/or second sets of legs 106 and 107.

Figure 2B:
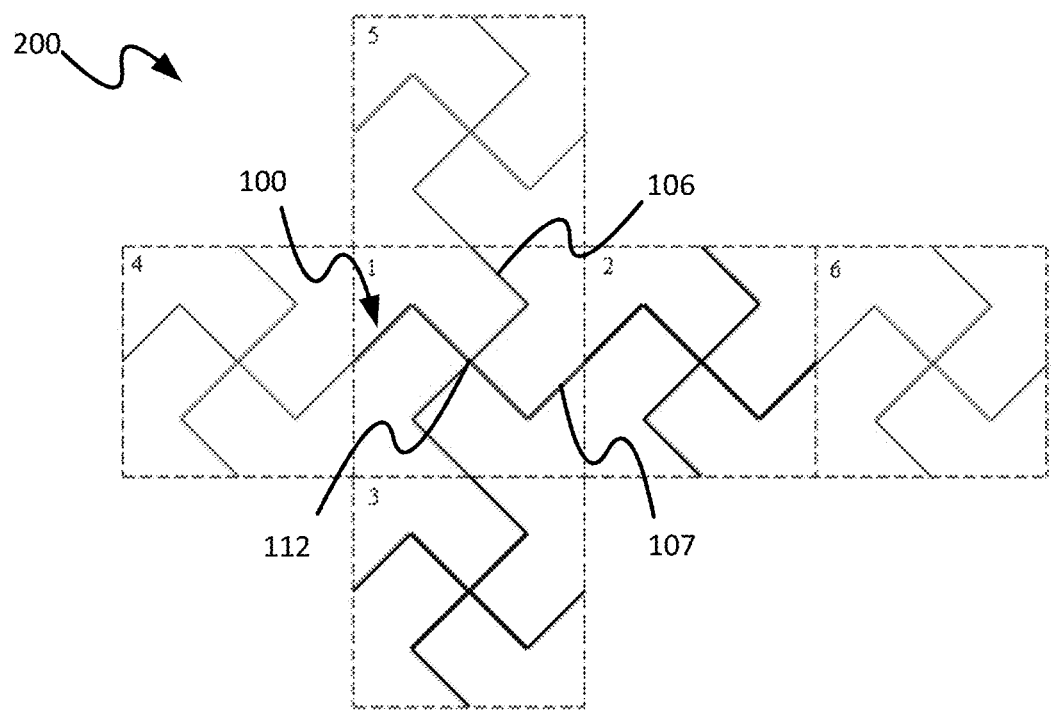
FIG. 2B is a two-dimensional representation of the cuboid cell of FIG. 2A, consistent with embodiments of the present disclosure.
Figure 2C:
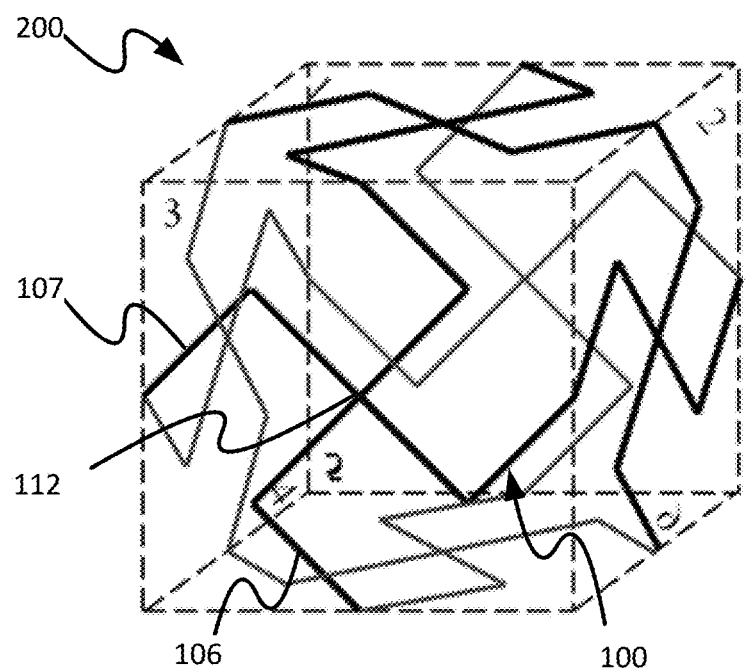
FIG. 2C is a three-dimensional perspective view of the two-dimensional representation of FIG. 2B, consistent with embodiments of the present disclosure.

For example, FIG. 2B shows each of the six surfaces of the cuboid cell 200 in a two-dimensional representation, wherein each of the six surfaces includes the chiral structure 100. FIG. 2C shows the two-dimensional representation of FIG. 2B in three-dimensional form. As shown, each of the chiral structures 100 may be connected (or coupled) together such that the cuboid cell 200 may generally be described as comprising a plurality of repeating chiral structures 100 connected (or coupled) at an intersection between one or more legs in the first and/or second sets of legs 106 and 107. As also shown, each chiral structure 100 may be generally described as having the same shape and orientation as adjacent chiral structures 100 of the cuboid cell 200. As such, adjacent chiral structures 100 may generally be described as having the same direction of rotation (e.g., clockwise or counter clockwise) relative to a respective midpoint 112 for each chiral structure 100. The direction of rotation relative to the midpoint 112 may be in a first direction when a tensile force is applied to the cuboid cell 200 and in a second direction when a compressive force is applied to the cuboid cell 200. The first direction of rotation being different from the second direction of rotation. In other words, the direction of rotation may be based, at least in part, on the direction of applied force (e.g., tensile or compressive force).

As a result of the rotation of the chiral structures 100, the cuboid cell 200 exhibits auxetic properties (e.g., a negative Poisson's ratio) in multiple planes (e.g., at least three planes). In other words, for example, the Poisson's ratio may be negative in each of the x-z, x-y, and y-z planes. In some instances, the rotation (and/or deformation) of each chiral structure 100 is restricted to a respective plane (or surface) of the cuboid cell 200.

Figures 3A, 3B, 3C:
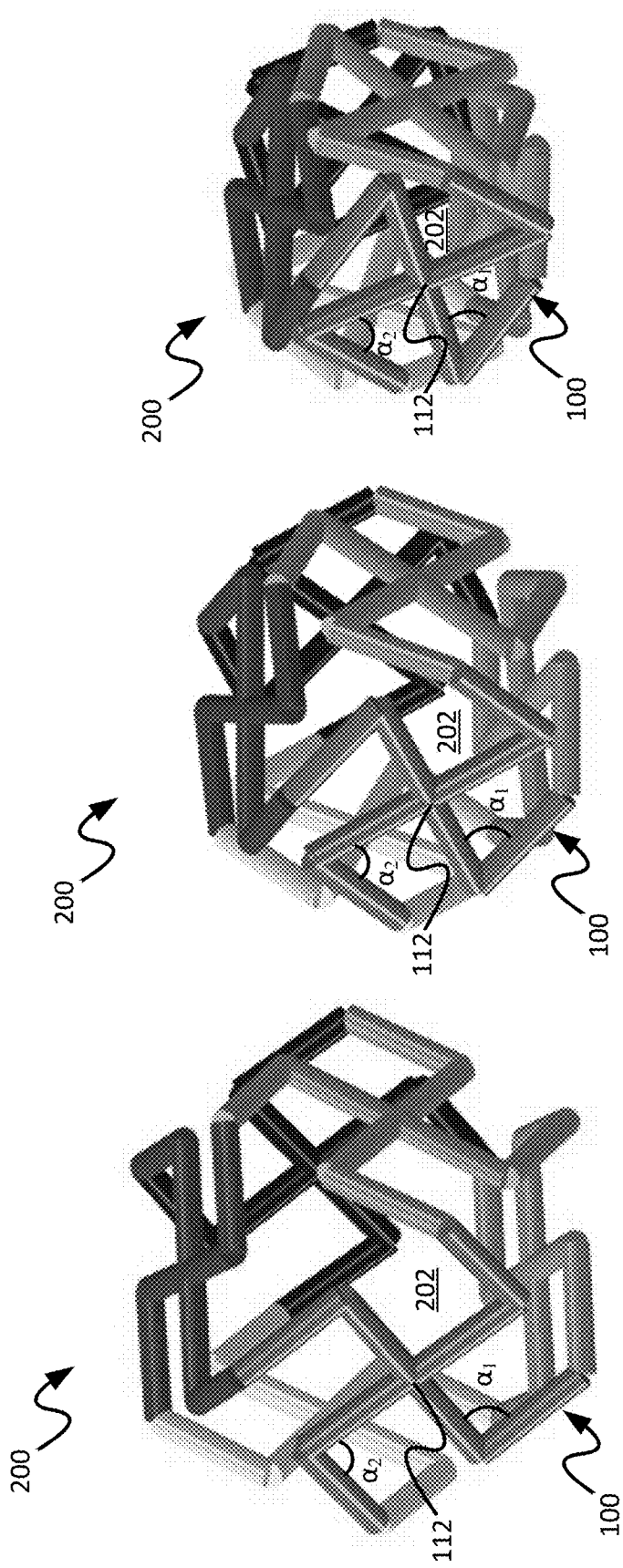
FIG. 3A is a perspective view of the cuboid cell of FIG. 2A having a first amount of deformation, consistent with embodiments of the present disclosure.
FIG. 3B is a perspective view of the cuboid cell of FIG. 2A having a second amount of deformation, consistent with embodiments of the present disclosure.
FIG. 3C perspective view of the cuboid cell of FIG. 2A having a third amount of deformation, consistent with embodiments of the present disclosure.

Referring again to FIG. 2A, as each chiral structure 100 rotates in response to the application of a force, the cuboid cell 200 exhibits auxetic properties, changing the bounded volume 202. For example, when a compressive force is applied to the cuboid cell 200, the bounded volume 202 decreases for at least a portion of the rotation of the chiral structures 100. As shown collectively in FIGS. 2A, 3A, 3B, and 3C, with continued application of a compressive force, the bounded volume 202 decreases, as each of the chiral structures 100 rotate in a clockwise direction relative to the midpoint 112, from an initial bounded volume (e.g., as shown in FIG. 2A), to a second bounded volume (e.g., as shown in FIG. 3A), to a third bounded volume (e.g., as shown in FIG. 3B), and to a fourth bounded volume (e.g., as shown in FIG. 3C). Similarly, FIGS. 4A to 4D show a plan view of the changes in the bounded volume 202 from the initial bounded volume (e.g., as shown in FIG. 4A), to the second bounded volume (e.g., as shown in FIG. 4B), to the third bounded volume (e.g., as shown in FIG. 4C), and to the fourth bounded volume (e.g., as shown in FIG. 4D). Therefore, one or more surfaces (or faces) of the cuboid cell 200 may generally be described as decreasing in surface area in response to a compressive force. The change in the bounded volume 202 (and/or the surface area of one or more faces of the cuboid cell 200) results from the rotation of the chiral structures 100.

As shown, the first leg angle $\alpha_1$ and the second leg angle $\alpha_2$ each decrease in magnitude in response to a compressive force. As a result, the bounded volume 202 may generally be described as decreasing in response to a compressive force. Similarly, when a tensile force is applied to the cuboid cell 200, each chiral structure 100 rotates such that the first and second leg angles $\alpha_1$ and $\alpha_2$ each increase in magnitude. As a result, the bounded volume 202 may generally be described as increasing in response to a tensile force. While in FIG. 1 the second leg angle $\alpha_2$ did not necessarily change in response to the application of a force, by connecting (or coupling) adjacent chiral structures 100 using the first and second sets of legs 106 and 107, the rotation of each chiral structure 100 may impact adjacent chiral structures 100 such that both the first leg angle $\alpha_1$ and the second leg angle $\alpha_2$ change in magnitude in response to the application of a force. In other words, each chiral structure 100 may interact with adjacent chiral structures 100 such that the cuboid cell 200 exhibits auxetic properties in multiple planes (e.g., at least three planes).

Figure 2D:
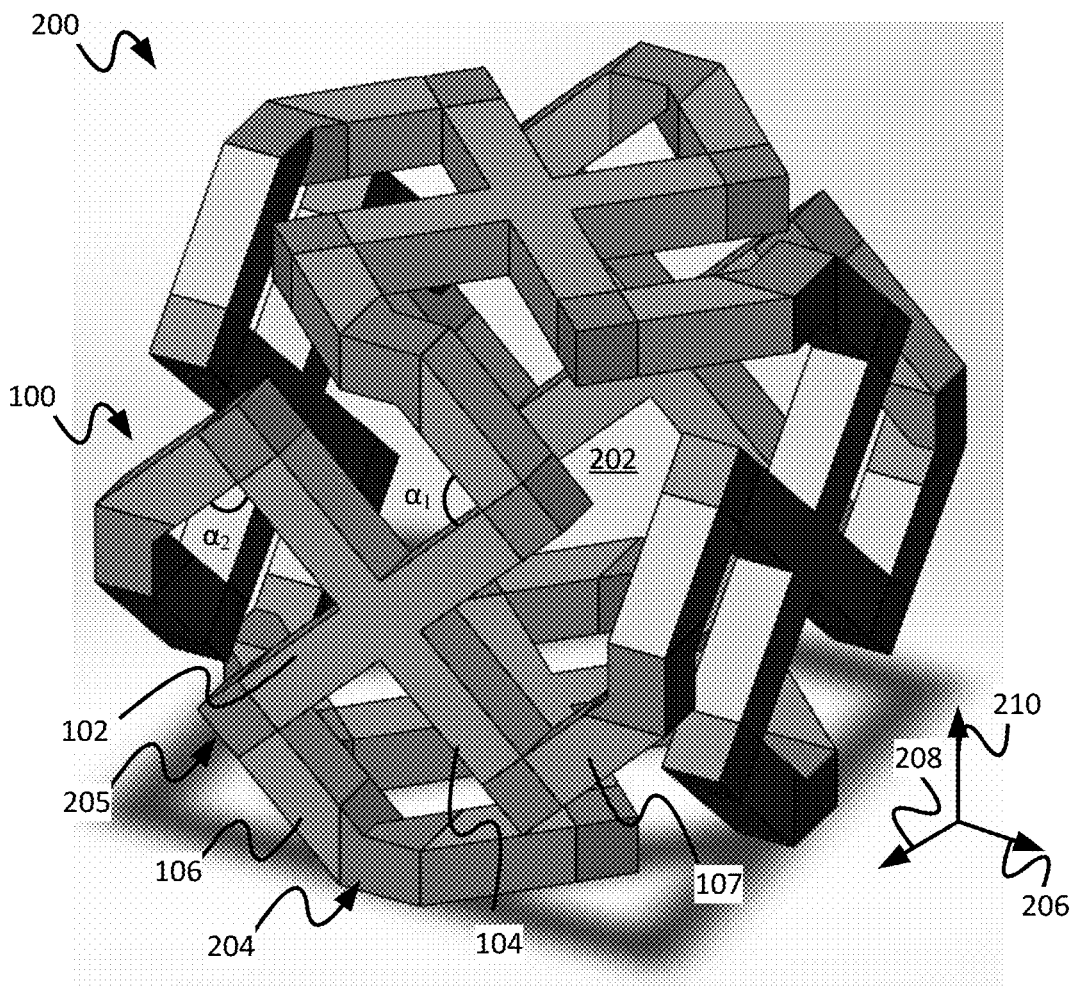
FIG. 2D is a perspective view of an example of the cuboid cell of FIG. 2A, consistent with embodiments of the present disclosure.
Figure 2E:
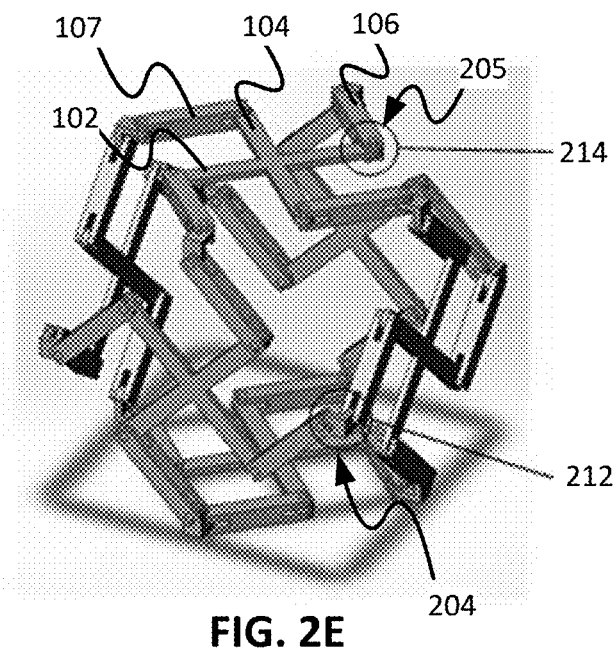
FIG. 2E is a perspective view of an example of the cuboid cell of FIG. 2A including one or more joints, consistent with embodiments of the present disclosure.

Referring also to FIG. 2D, each of the legs included in the first and second sets of legs 106 and 107 may define a plurality of hinge portions 204 and 205. As shown, at least one structure hinge portion 204 may be defined between adjacent chiral structures 100. In other words, adjacent chiral structures 100 may be coupled together at one or more of the structure hinge portions 204. A leg hinge portion 205 may be defined at an intersection of the first and second cross members 102 and 104 with a corresponding leg from the first or second set of legs 106 and 107. In other words, one or more legs of the first and second sets of legs 106 and 107 may extend from and/or be coupled to a respective one of the first or second cross members 102 and 104 at a respective leg hinge portion 205.

The hinge portions 204 and 205 may influence the mechanical properties of the chiral structure 100 (e.g., the Poisson's ratio). For example, the hinge portions 204 and 205 may be modified and/or altered to control the rate of change in at least one of the first and/or second leg angles $\alpha_1$ and $\alpha_2$. Therefore, the rate of change in the bounded volume 202 may also be influenced by the hinge portions 204 and 205. As such, the hinge portions 204 can be used to tailor the auxetic properties of the cuboid cell 200 to meet one or more desired design constraints.

In some instances, the hinge portions 204 and 205 may be integrally formed from at least one of the first and second cross members 102 and 104 and/or at least one of the first and second sets of legs 106 and 107. In these instances, the Young's modulus of the material at the hinge portions 204 and 205 may be changed such that a desired rate of change in at least one of the first and/or second leg angles $\alpha_1$ and $\alpha_2$ is achieved. Therefore, in some instances, the materials of the first and second cross members 102 and 104 and the material of the first and second sets of legs 106 and 107 may be different from the material of the hinge portions 204 and 205.

Figure 2F:
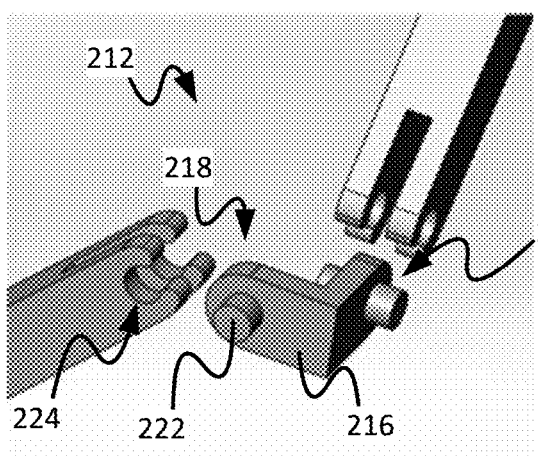
FIG. 2F is a perspective exploded view of an example of a joint that may be used in the cuboid cell of FIG. 2E, consistent with embodiments of the present disclosure.
Figure 2G:
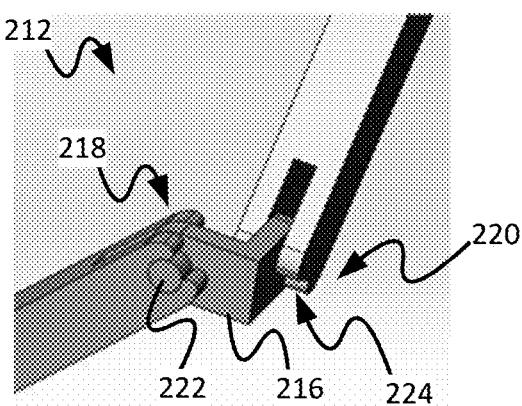
FIG. 2G is a perspective view of the joint of FIG. 2F, consistent with embodiments of the present disclosure.

In some instances, and as shown in FIGS. 2E-2I, the structure hinge portion 204 may include a structure joint 212 and the leg hinge portion 205 may include a leg joint 214. As shown in FIGS. 2F and 2G, the structure joint 212 may include a pivot member 216 having a first pivot point 218 and a second pivot point 220. The axes of rotation for the first and second pivot points 218 and 220 may be perpendicular to each other. As shown, the first and second pivot points 218 and 220 include one or more structure joint cylindrical protrusions 222. The structure joint cylindrical protrusion 222 may extend from the pivot member 216 such that each structure joint cylindrical protrusion 222 is capable of being received within a corresponding structure joint cutout 224 in a respective leg of the first or second set of legs 106 and 107 (e.g., as shown in FIG. 2G). In operation, the structure joint cutout 224 is capable of rotating relative to the structure joint cylindrical protrusion 222.

Figure 2H:
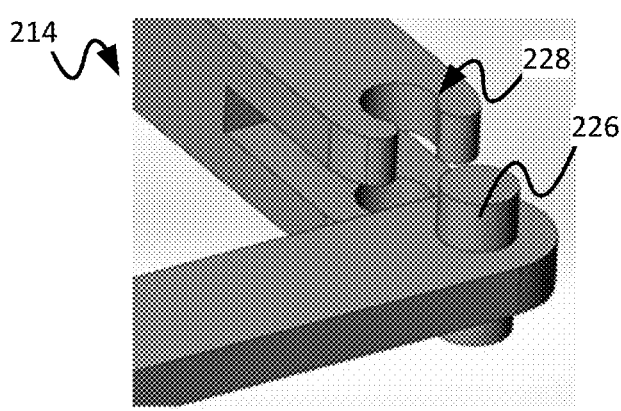
FIG. 2H is a perspective exploded view of another example of a joint that may be used in the cuboid cell of FIG. 2E, consistent with embodiments of the present disclosure.
Figure 2I:
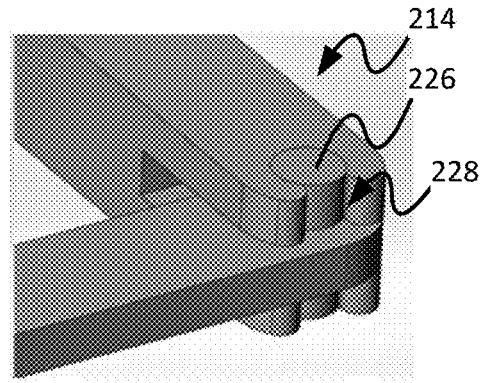
FIG. 2I is a perspective view of the joint of FIG. 2H, consistent with embodiments of the present disclosure.

As shown in FIGS. 2H and 2I, the leg joint 214 may be formed between a respective leg of the first or second set of legs 106 and 107 and a respective cross member of the first or second cross members 102 and 104. As shown, one or more leg joint cylindrical protrusions 226 extends from one or more distal ends of the first and second sets of distal ends 111 and 113 of the first and second cross members 102 and 104. The one or more leg joint cylindrical protrusions 226 are capable of being received within a corresponding leg joint cutout 228 in a respective leg of the first and second sets of legs 106 and 107 (e.g., as shown if FIG. 2I). In operation the leg joint cutout 228 is capable of rotation relative to the leg joint cylindrical protrusion 226.

Therefore, the hinge portions 204 and 205 may be generally described as including a joint capable of rotation about a pivot point in response to the application of a force to the cuboid cell 200. If each of the joints 212 and 214 were frictionless (e.g., exhibit no rotational resistance), the Poisson's ratio of the resulting cuboid cell 200 may be negative one. In some instances, one or more of the joints 212 and 214 may include a rotation resisting mechanism (e.g., a spring, friction forces at the joint, and/or any other suitable rotation resisting mechanism). In these instances, the design of the joints 212 and 214 may be changed/modified such that a desired rate of change in at least one of the first and/or second leg angles $\alpha_1$ and $\alpha_2$ is achieved.

In some instances, a cross section of the hinge portions 204 and 205 may be changed such that a desired rate of change in at least one of the first and/or second leg angles $\alpha_1$ and $\alpha_2$ is achieved. For example, the cross section of the hinge portions 204 and 205 may be narrowed relative to one or more of the first and second cross members 102 and 104 and and/or the first and second sets of legs 106 and 107.

Regardless of the form of the hinge portions 204 and 205, the hinge portions 204 and 205 may be generally described as deforming, rotating, and/or pivoting in response to the application of a force to the cuboid cell 200. The resistance of the hinge portions 204 and 205 to deformation, rotation, and/or pivoting may generally be described as a stiffness of the hinge portions 204 and 205. Similarly, the resistance to deformation (e.g., bending or flexing) of the first and second cross members 102 and 104 and/or the legs in the first and second sets of legs 106 and 107 may generally be described as a stiffness of the first and second cross members 102 and 104 and the legs in the first and second sets of legs 106 and 107. A rate of changed experienced by at least one of the first and/or second leg angles $\alpha_1$ and $\alpha_2$, in response to the application of a force to the cuboid cell 200, may be based, at least in part, on the stiffness of the hinge portions 204 and 205 and the stiffness of the first and second cross members 102 and 104 and the first and second sets of legs 106 and 107. For example, as the stiffness of the first and second cross members 102 and 104 and the first and second sets of legs 106 and 107 is increased relative to the stiffness of the hinge portions 204 and 205, the rate of change in the first and/or second leg angles $\alpha_1$ and $\alpha_2$ may increase.

Stated another way, the hinge portions 204 and 205 preferably are configured to rotate before the legs of the first and second sets of legs 106 and 107 or the first and second cross members 102 and 104 bend. That is, the first and second sets of legs 106 and 107 and the first and second cross members 102 and 104 are such that 90% or more of an applied force to the cuboid cell 200 is transferred to the hinge portions 204 and 205 such that the hinge portions 204 and 205 respond in rotation.

Therefore, changing the stiffness of the hinge portions 204 and 205 relative to one or more of the first and second cross members 102 and 104 and/or the first and second sets of legs 106 and 107 may result in the cuboid cell 200 exhibiting different auxetic properties. For example, in some instances, a stiffness ratio of the cuboid cell 200 may be described as the ratio of at least one of the Young's modulus of the material of the first and second cross members 102 and 104 and/or the first and second sets of legs 106 and 107 to the Young's modulus of the material of one of the hinge portions 204 and 205. The stiffness ratio is generally illustrated in equation 1, below, wherein $E_{102}$ corresponds to the Young's modulus for the material of the first cross member 102, $E_{104}$ corresponds to the Young's modulus for the material of the second cross member 104, $E_{106}$ corresponds to the Young's modulus for the material of the first set of legs 106, $E_{107}$ corresponds to the Young's modulus for the material of the second set of legs 107, $E_{204}$ corresponds to the Young's modulus for the material of the structure hinge portion 204, and $E_{205}$ corresponds to the Young's modulus for the material of the leg hinge portion 205.

$$\text{Stiffness Ratio} = \frac{E_{102}}{E_{204} \text{ or } E_{205}} \text{ or } \frac{E_{104}}{E_{204} \text{ or } E_{205}} \text{ or } \frac{E_{106}}{E_{204} \text{ or } E_{205}} \text{ or } \frac{E_{107}}{E_{204} \text{ or } E_{205}} \quad [1]$$

As noted above, such materials may be different. That is, the material of the first and second cross members 102 and 104 and the materials of the first and second sets of legs 106 and 107 may be different than the material of the hinge portions 204 and 205. The Young's modulus of the material of the first and second cross members 102 and 104 and/or the first and second sets of legs 106 and 107 may, for example, be in a range of 100 megapascals (MPa) to 1 gigapascals (GPa) and the Young's modulus of the material for the hinge portions 204 and 205 may, for example, be in a range of 1 MPa to 1 GPa. More specifically, for example, the Young's modulus of the material of the first and second cross members 102 and 104 and/or the first and second sets of legs 106 and 107 may be in a range of 500 MPa to 1 GPa and the Young's modulus of the material for the hinge portions 204 and 205 may be in a range of 1 MPa to 100 MPa.

Table 1 shows an example of the effect of the stiffness ratio on the Poisson's ratio when the cuboid cell 200 is exposed to a unilateral compressive force.

TABLE 1

| | Stiffness ratio | | | |
|---|---|---|---|---|
| | 1:1 | 10:1 | 100:1 | 1000:1 |
| Poisson's Ratio | −0.15 | −0.19 | −0.49 | −0.86 |

As can be seen in Table 1, when the cuboid cell 200 is exposed to a uniaxial compressive force along, for example, an x-axis 206, a y-axis 208, or a z-axis 210 the Poisson's ratio of the cuboid cell 200 is negative, for example, in the x-z, x-y, and y-z planes. In some instances, the Poisson's ratio may be the same in each plane regardless of the axis along which a force is applied to the cuboid cell 200. In other instances, the Poisson's ratio may vary based on the axis along which a force is applied to the cuboid cell 200. As can also be seen from Table 1, as the stiffness ratio increases, the Poisson's ratio becomes increasingly negative.

While Table 1 shows a stiffness ratio of 1:1, 10:1, 100:1, and 1000:1, the present disclosure is not limited to only these stiffness ratios. For example, the stiffness ratio may be 500:1, 1500:1, 2000:1, 2500:1, or any other suitable stiffness ratio.

While the hinge portions 204 and 205 are generally described as having the same Young's modulus and/or stiffness, such a configuration is not required. For example, at least one of the hinge portions 204 and/or 205 may have a Young's modulus and/or stiffness that is different from at least one other hinge portion 204 and/or 205.

Figure 5:
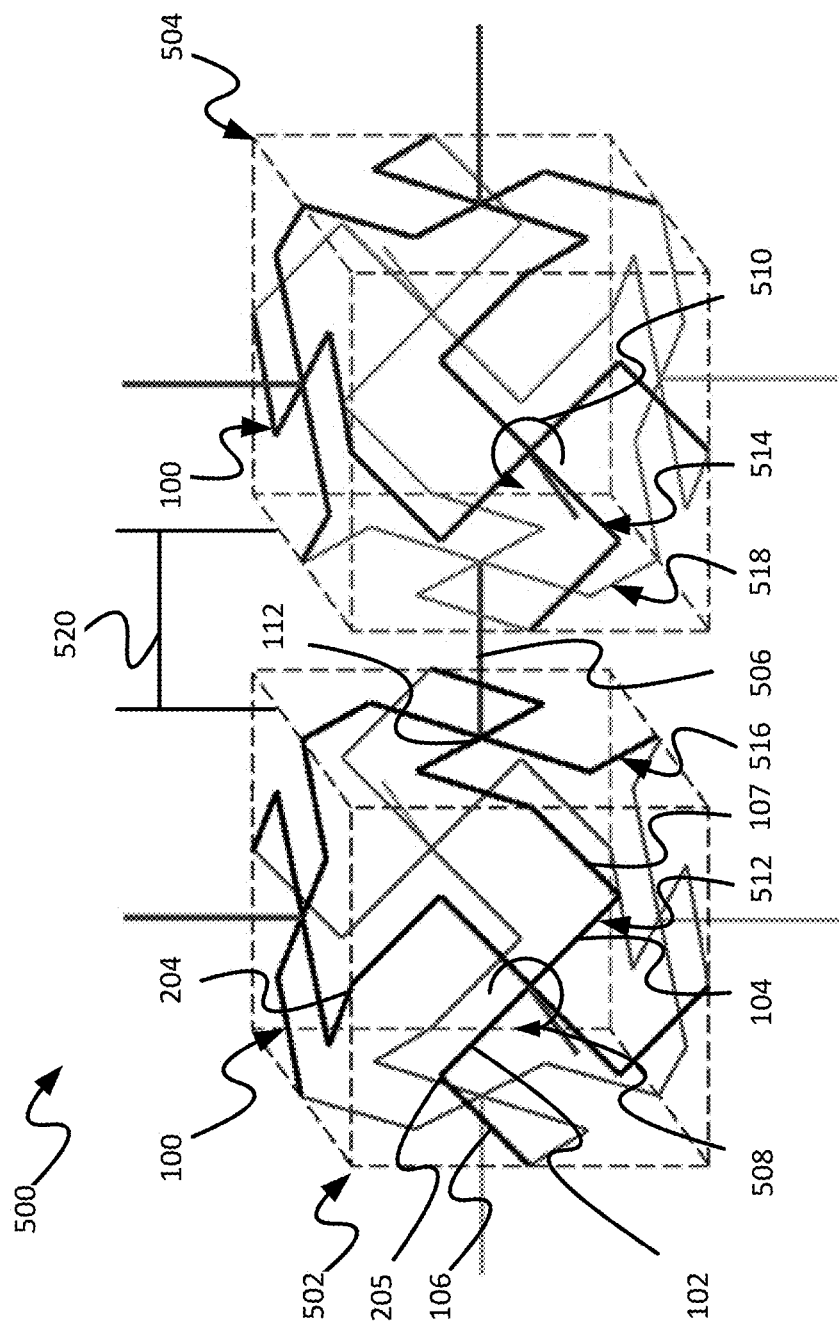
FIG. 5 is a perspective view of a periodic structure that includes a plurality of the cuboid cells of FIG. 2A, consistent with embodiments of the present disclosure.

FIG. 5 shows a periodic structure 500 including a first cuboid cell 502 coupled to a second cuboid cell 504 using a connecting rib 506, wherein the periodic structure 500 may exhibit auxetic properties in multiple planes (e.g., at least three planes). Each of the first and second cuboid cells 502 and 504 may be one example of the cuboid cell 200 of FIG. 2. As shown, the first cuboid cell 502 is defined by a plurality of chiral structures 100 having a first direction of rotation 508 (e.g., clockwise when exposed to a compressive force) and the second cuboid cell 504 is defined by a plurality of chiral structures 100 having a second direction of rotation 510 (e.g., counter clockwise when exposed to a compressive force). The first direction of rotation 508 may be opposite the second direction of rotation 510. Therefore, adjacent chiral structures 512 and 514 (e.g., chiral structures in a single plane) may be mirror images of each other and opposing chiral structures 516 and 518 (e.g., chiral structures in two parallel planes) may have the same shape and orientation. By having the first direction of rotation 508 opposite the second direction of rotation 510, the opposing chiral structures 516 and 518 rotate in the same direction relative to the periodic structure 500. As such, the connecting rib 506 may not be twisted (e.g., exposed to a torque) in response to a rotation of the opposing chiral structures 516 and 518.

The connecting rib 506 may extend between respective midpoints 112 of opposing chiral structures 516 and 518. Therefore, the connecting rib 506 may be described as connecting (or coupling) chiral structures 100 having opposite directions of rotation. In some instances, six cuboid cells 200 can be coupled to a single cuboid cell 200 using six connecting ribs 506.

The connecting rib 506 may have different mechanical properties (e.g., Young's modulus) than the opposing chiral structures 516 and 518. For example, a Young's modulus of a material for the connecting rib 506 may be greater than (or less than) a Young's modulus of a material for one or more of the first and second cross members 102 and 104, the first and second sets of legs 106 and 107, and/or the hinge portions 204 and 205. In some instances, the connecting rib 506 may share mechanical properties (e.g., Young's modulus) with one or more elements defining the opposing chiral structures 516 and 518. For example, the Young's modulus of a material for the connecting rib 506 may measure equal to the Young's modulus of material for one or more of the first and second cross members 102 and 104, the first and second sets of legs 106 and 107, and/or the hinge portions 204 and 205. Therefore, in some instances, for example, at least a portion of the connecting rib 506 may be integrally formed or non-integrally formed from at least a portion of one or more of the opposing chiral structures 516 and 518.

As further shown, the connecting rib 506 may separate the first cuboid cell 502 from the second cuboid cell 504 by a separation distance 520. The separation distance 520 may measure, for example, in a range of 10 µm to 10 mm. More specifically, the separation distance 520 may measure, for example, in a range of 20 µm to 5 mm. Even more specifically, the separation distance 520 may measure, for example, in a range of 50 µm to 1 mm.

Figure 6:
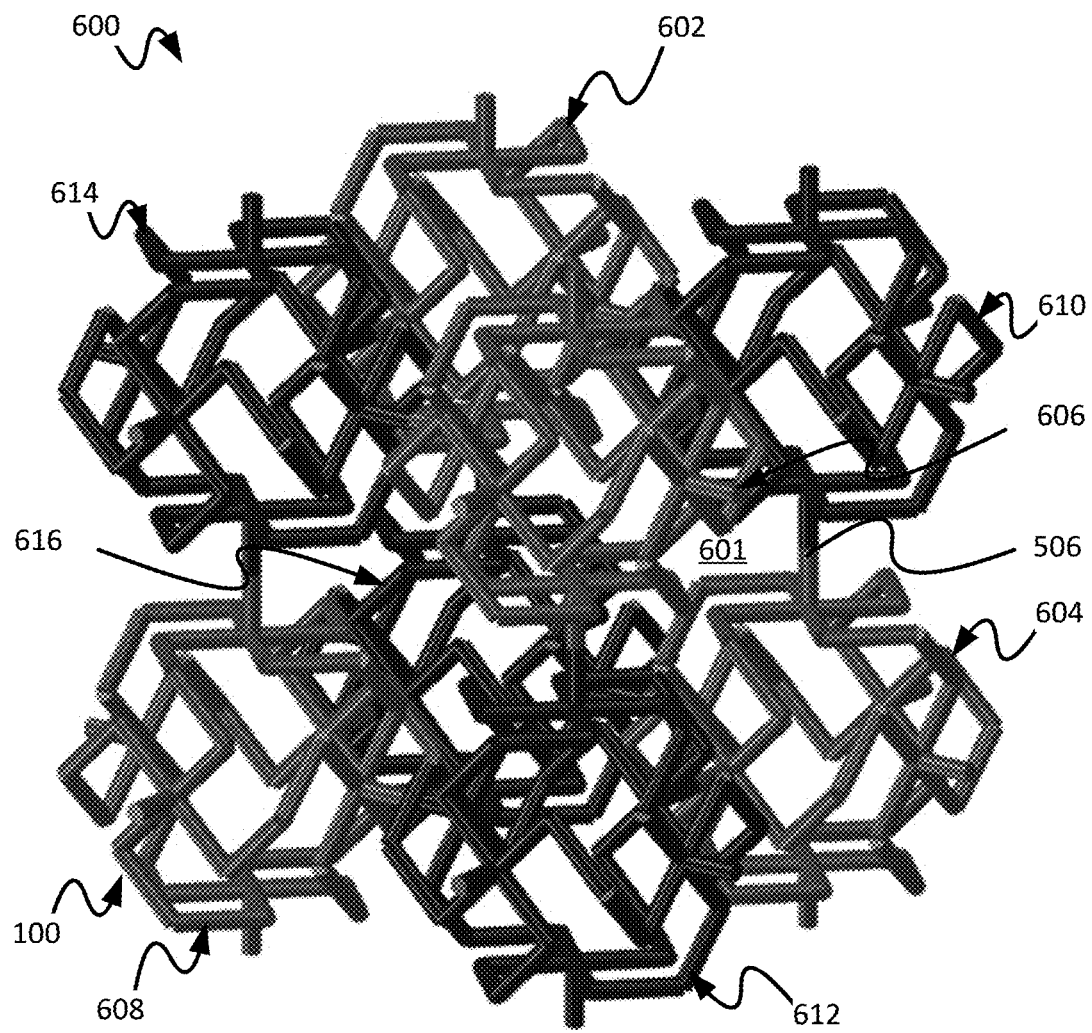
FIG. 6 is a perspective view of another periodic structure that includes a plurality of the cuboid cells of FIG. 2A, consistent with embodiments of the present disclosure.

FIG. 6 shows a cuboid periodic structure 600, which may be an embodiment of the periodic structure 500 of FIG. 5. As shown, the cuboid periodic structure 600 includes cuboid cells 602, 604, 606, 608, 610, 612, 614, and 616 that define a bounded cuboid periodic structure volume 601. The cuboid cells 602, 604, 606, 608, 610, 612, 614, and 616 each include a plurality of chiral structures 100 capable of rotation in response to the application of a force and may be examples of the cuboid cell 200 of FIG. 2A. Adjacent cuboid cells (e.g., cuboid cells connected to each other by the connecting rib 506) may include chiral structures 100 having opposite directions of rotation. For example, cuboid cells 602, 604, 606, and 608 may include chiral structures 100 capable of rotation in a clockwise direction (e.g., when exposed to a compressive force) and cuboid cells 610, 612, 614, and 616 may include chiral structures 100 capable of rotation in a counter clockwise direction (e.g., when exposed to a compressive force). Therefore, the cuboid periodic structure 600 may exhibit auxetic properties. For example, the cuboid periodic structure 600 may have a negative Poisson's ratio in three planes in response to the application of a uniaxial force.

As shown, the connecting rib 506 extends between a respective one of the cuboid cells 602, 604, 606, and 608 and a respective one of the cuboid cells 610, 612, 614, and 616. As such, the connecting rib 506 may generally be described as connecting (or coupling) cuboid cells 200 including chiral structures 100 that have opposite directions of rotation.

Figure 7:
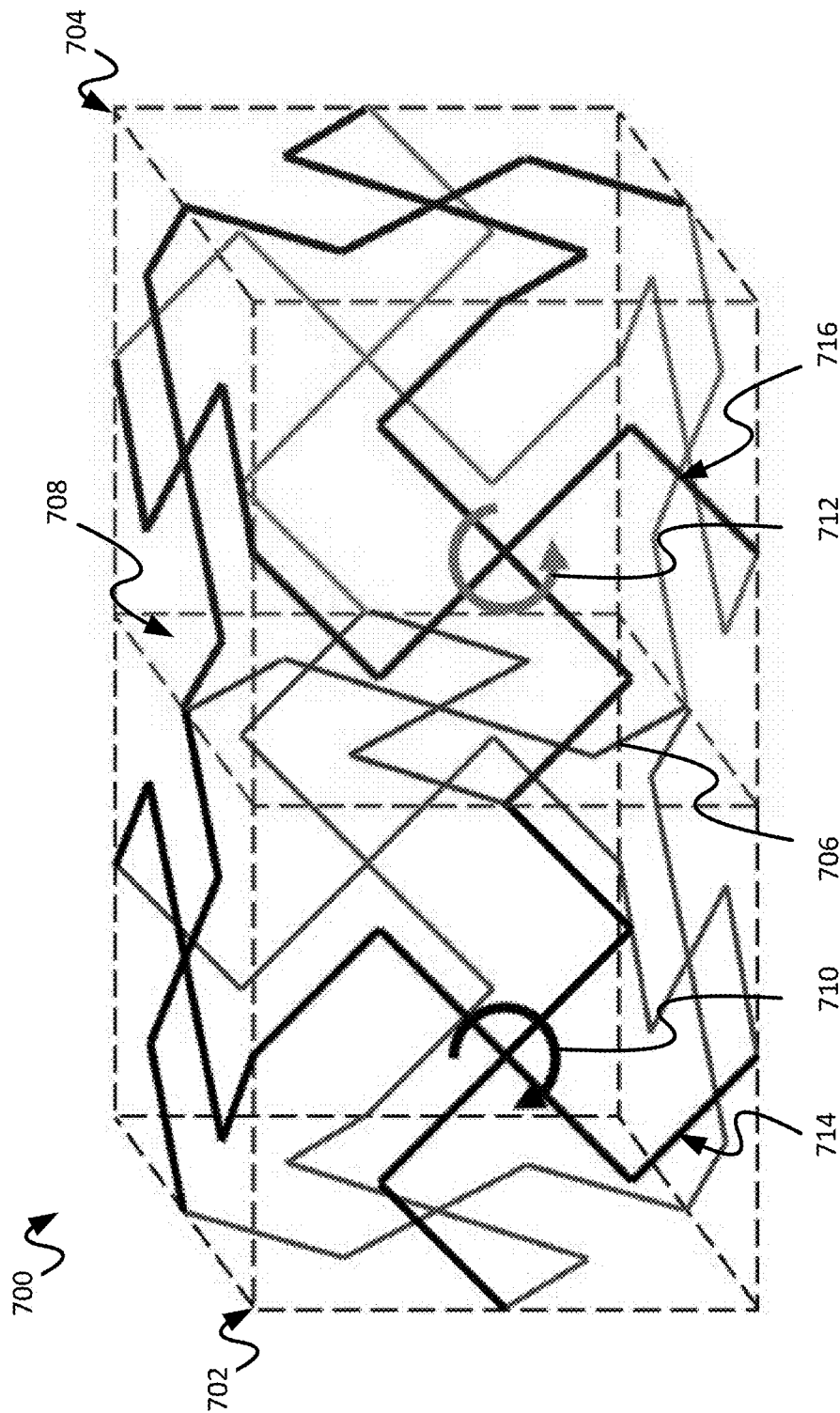
FIG. 7 is a perspective view of another periodic structure that includes a plurality of the cuboid cells of FIG. 2A, consistent with embodiments of the present disclosure.

FIG. 7 shows a periodic structure 700 having a first cuboid cell 702 and a second cuboid cell 704, the first cuboid cell 702 being directly coupled to the second cuboid cell 704 at a chiral structure 100, wherein, the periodic structure 700 may exhibit auxetic properties in multiple planes (e.g., at least three planes). As shown, the first cuboid cell 702 and the second cuboid cell 704 may share a common chiral structure 706. As such, the first cuboid cell 702 and the second cuboid cell 704 may generally be described as sharing a common surface 708.

As shown, the first cuboid cell 702 may be defined by a plurality of chiral structures 100 having a first direction of rotation 710 (e.g., clockwise when exposed to a compressive force) and the second cuboid cell 704 may be defined by a plurality of chiral structures 100 having a second direction of rotation 712 (e.g., counter clockwise when exposed to a compressive force). The first direction of rotation 710 may be opposite the second direction of rotation 712. Therefore, adjacent chiral structures 714 and 716 may be mirror images of each other and the common chiral structure 706 may have a direction of rotation relative to the first cuboid cell 702 that is opposite of the direction of rotation relative to the second cuboid cell 704. By having the first direction of rotation 710 opposite the second direction of rotation 712, the first and second cuboid cells 702 and 704 may be described as rotating in the same direction relative to the periodic structure 700 in response to the application of a uniaxial force.

Figure 8:
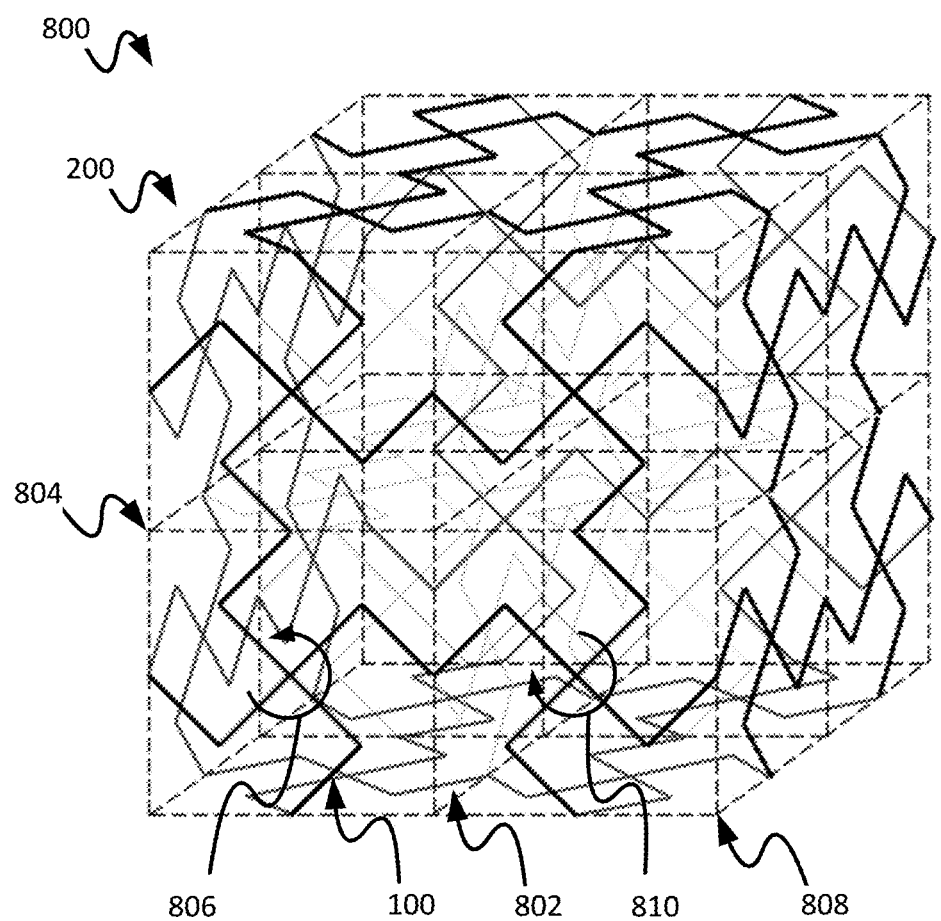
FIG. 8 is a perspective view of another periodic structure that includes a plurality of the cuboid cells of FIG. 2A, consistent with embodiments of the present disclosure.

FIG. 8 shows an example of a cuboid periodic structure 800 that may be an embodiment of the periodic structure 700 of FIG. 7. As shown, the cuboid periodic structure 800 may include a plurality of cuboid cells 200 (e.g., eight cuboid cells 200), wherein adjacent cuboid cells 200 (e.g., cuboid cells having a common surface 802) include chiral structures 100 having opposite directions of rotation. For example, a first adjacent cuboid cell 804 may include chiral structures 100 having a first direction of rotation 806 and a second adjacent cuboid cell 808 may include chiral structures 100 having a second direction of rotation 810, wherein the first direction of rotation 806 is opposite the second direction of rotation 810.

Figure 9:
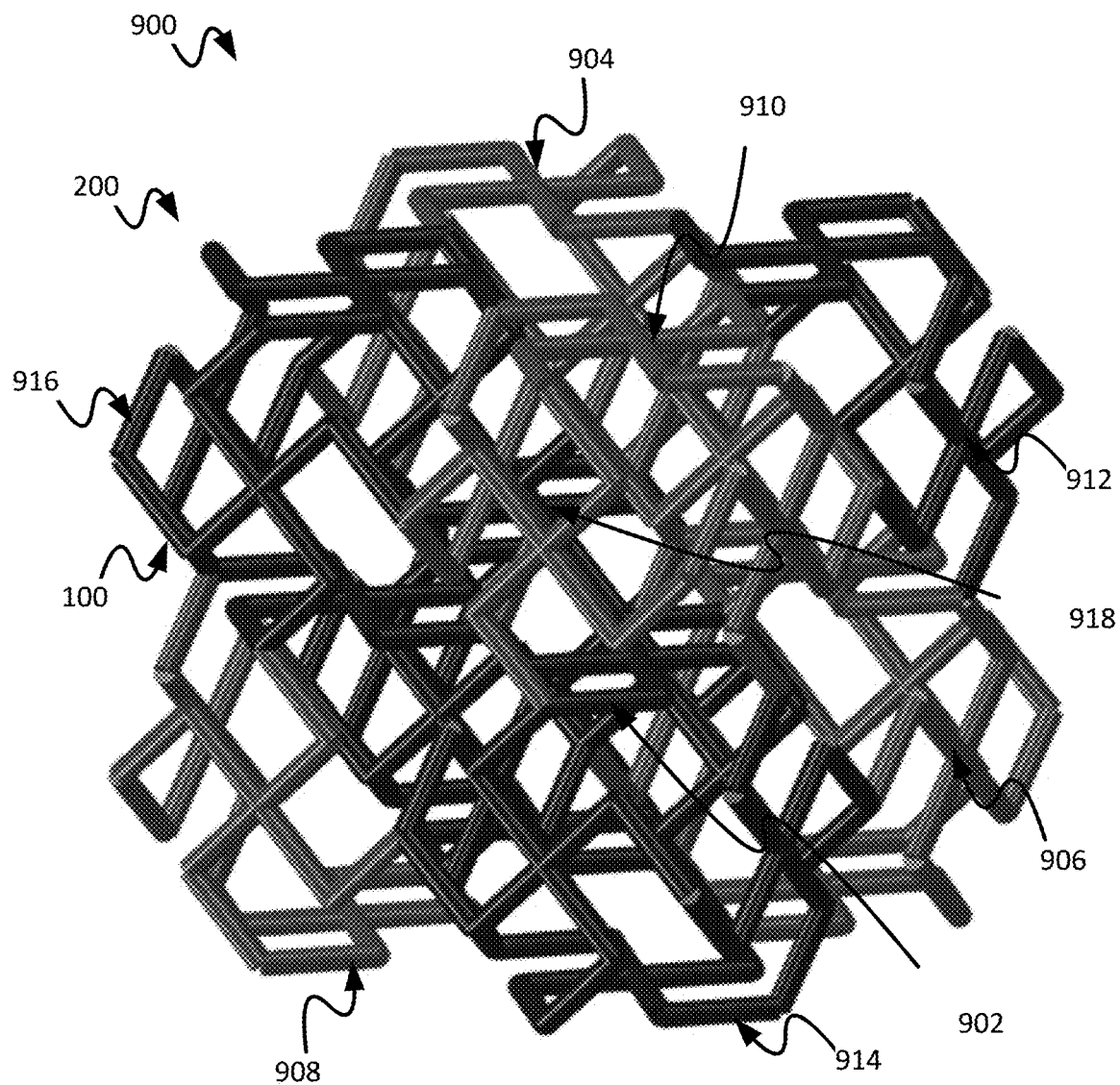
FIG. 9 is a perspective view of an example of the periodic structure of FIG. 8, consistent with embodiments of the present disclosure.

FIG. 9 shows an example of a cuboid periodic structure 900 that may be an embodiment of the cuboid periodic structure 800 of FIG. 8. As shown, the cuboid periodic structure 900 includes a plurality of cuboid cells 200 that each include a plurality of chiral structures 100 capable of rotation in response to the application of a force. Adjacent cuboid cells 200 (e.g., cuboid cells 200 having a common chiral structure 902) may include chiral structures 100 having opposite directions of rotation. For example, cuboid cells 904, 906, 908, and 910 may include chiral structures 100 capable of rotation in a clockwise direction (e.g., when exposed to a compressive force) and cuboid cells 912, 914, 916, and 918 may include chiral structures 100 capable of rotation in a counter clockwise direction (e.g., when exposed to a compressive force).

Figure 10:
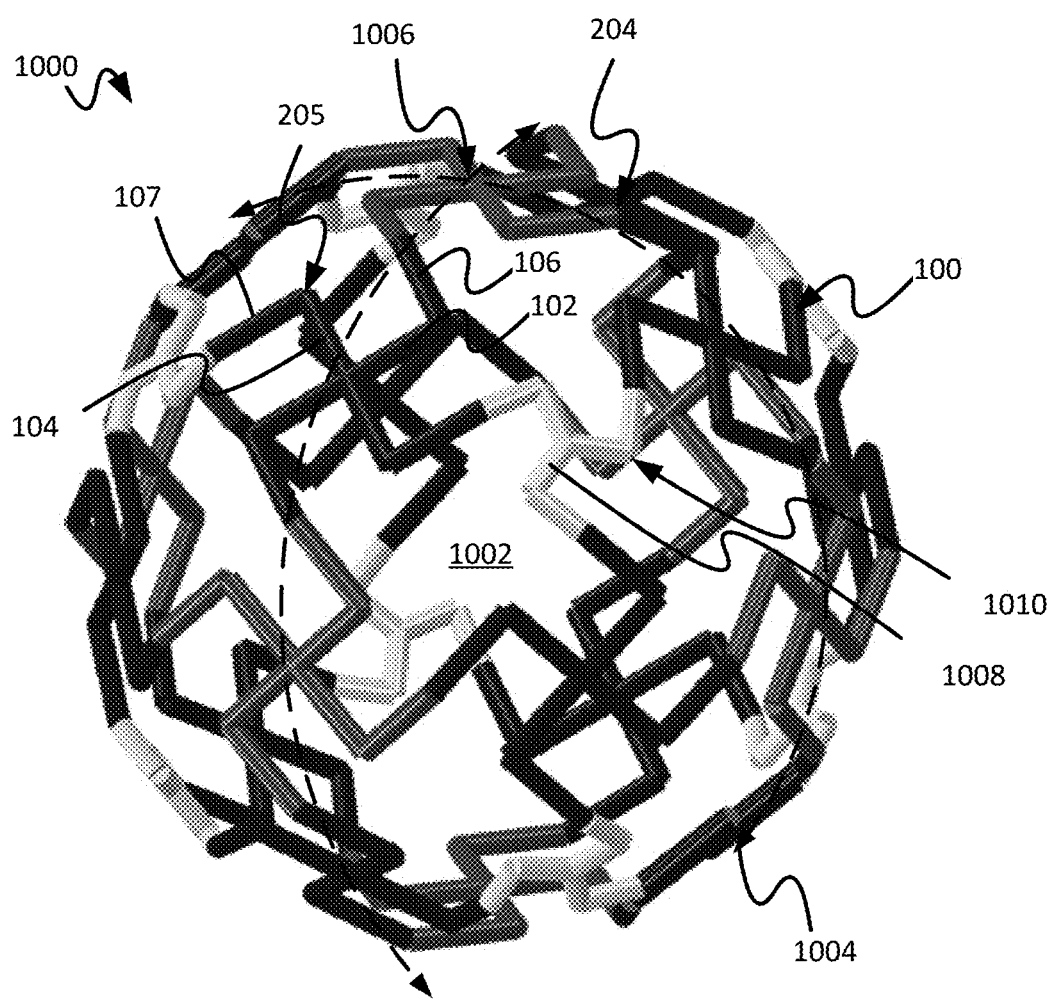
FIG. 10 is a perspective view of a spherical polygon cell that is defined, at least in part, by the chiral structure of FIG. 1, consistent with embodiments of the present disclosure.

While the above disclosure has described the cuboid cell 200 as having a generally cubic shape, such a configuration is not limiting. In other words, the cuboid cell 200 may be any polygonal shaped cell that at least partially defines and/or encloses a bounded volume. For example, as shown in FIG. 10, one or more chiral structures 100 may define a spherical polygon cell 1000, wherein the spherical polygon cell 1000 may exhibit auxetic properties in multiple planes (e.g., at least three planes). The spherical polygon cell 1000 may be, for example, one or more of a tetrahedral spherical polyhedron, an octahedral spherical polyhedron, an icosahedral spherical polyhedron, a dihedral spherical polyhedron, and/or any other suitable spherical polyhedron. As shown, the spherical polygon cell 1000 at least partially defines a bounded volume 1002 that may change in magnitude in response to the application of a uniaxial force.

As shown, a plurality of chiral structures 100 extend along one or more great arcs 1004 of the spherical polygon cell 1000 (e.g., the arcs that provide the shortest distance between two points on the spherical polygon cell 1000). Chiral structures 100 positioned at one of a plurality of intersections 1006 of one or more great arcs 1004 may form part of two or more great arcs 1004. Chiral structures 100 not positioned at one of the intersections 1006 may be connected (or coupled) to an intermediary structure 1008. The intermediary structure 1008 may connect (or couple) two or more chiral structures 100 that are not positioned at one of the intersections 1006. As shown, the intermediary structure 1008 may be generally described as a three-point star having one or more legs extending therefrom.

The intermediary structure 1008 may connect (or couple) to one or more legs included in the first and/or second set of legs 106 and 107 of a respective chiral structure 100. Therefore, the intermediary structure 1008 may have different mechanical properties (e.g., Young's modulus) than at least a portion of the chiral structure 100. For example, a Young's modulus of a material for the intermediary structure 1008 may be greater than (or less than) a Young's modulus of a material for one or more of the first and second cross members 102 and 104, the first and second sets of legs 106 and 107, and/or the hinge portions 204 and 205. In some instances, the intermediary structure 1008 may have the same mechanical properties (e.g., Young's modulus) as at least a portion of the chiral structure 100. For example, a Young's modulus of a material for the intermediary structure 1008 may be the same as a Young's modulus of a material for one or more of the first and second cross members 102 and 104, the first and second sets of legs 106 and 107, and/or the hinge portions 204 and 205.

As also shown, the intermediary structure 1008 includes one or more intermediary hinge portions 1010. The intermediary hinge portions 1010 may function similar to the hinge portions 204 and 205 of the chiral structure 100. For example, a material at the intermediary hinge portions 1010 may have a Young's modulus that is less than (or greater than) a Young's modulus of a material forming another portion of the intermediary structure 1008.

Figure 11:
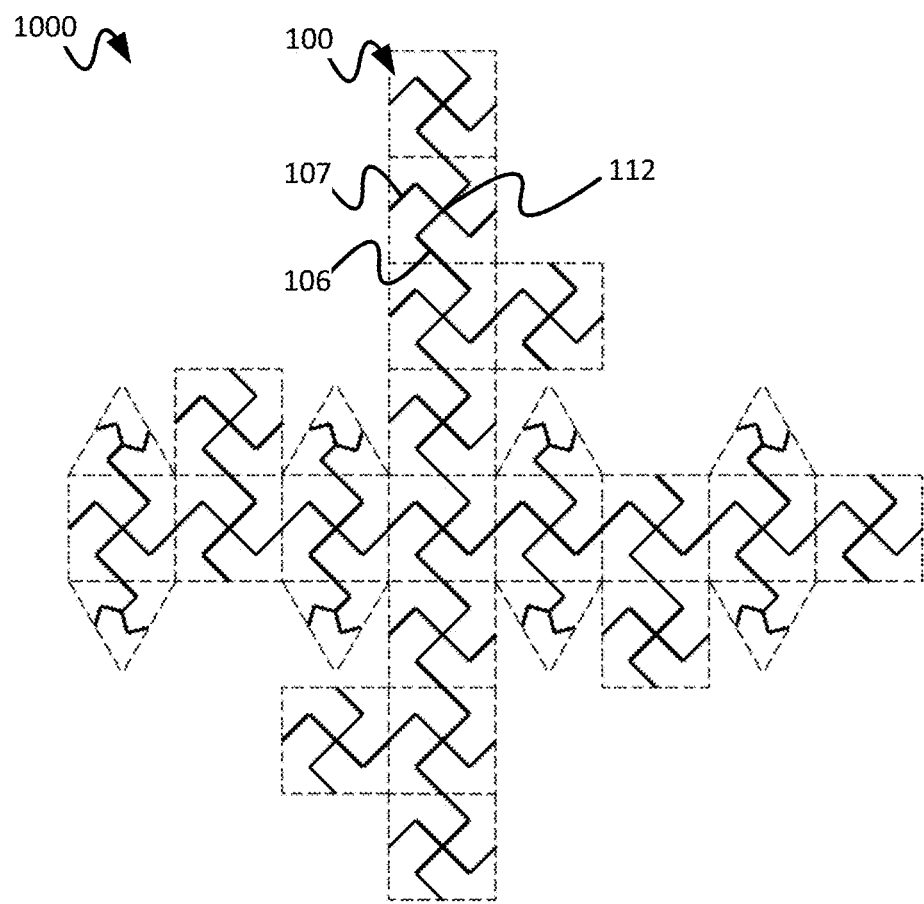
FIG. 11 is a two-dimensional representation of the spherical polygon cell of FIG. 10, consistent with embodiments of the present disclosure.
Figure 12:
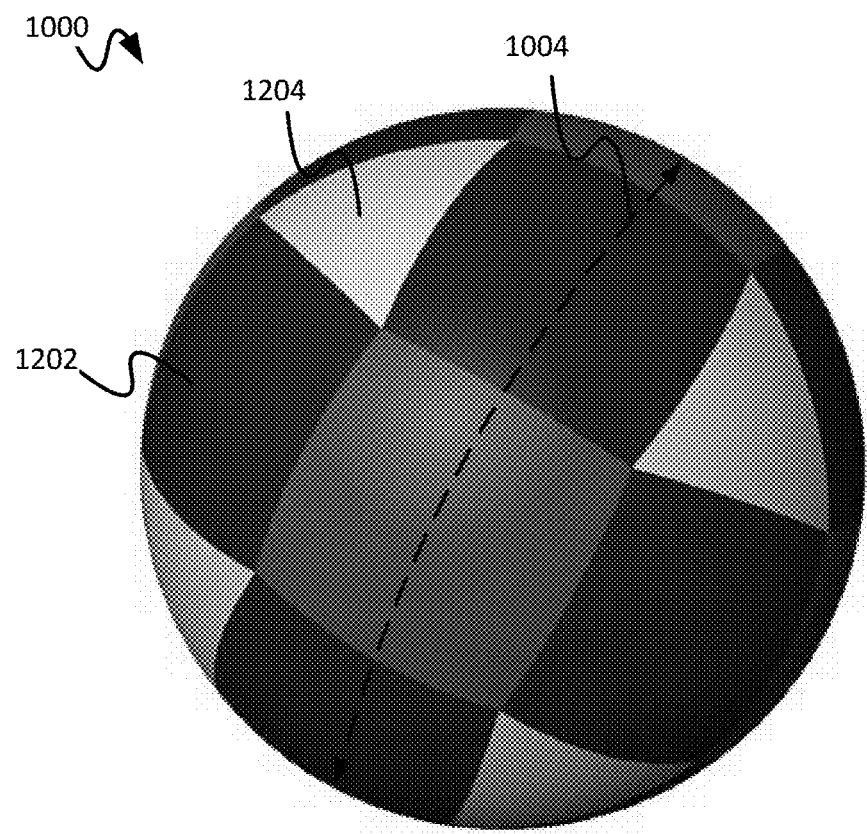
FIG. 12 is another representation of an example of the spherical polygon cell of FIG. 10, consistent with embodiments of the present disclosure.

FIG. 11 shows a two-dimensional representation of each of the surfaces of one example of the spherical polygon cell 1000. FIG. 12 shows an example three-dimensional representation of the two-dimensional representation of FIG. 11. As shown, in FIG. 11, each of the chiral structures 100 may be connected (or coupled) together such that the spherical polygon cell 1000 may generally be described as comprising a plurality of repeating chiral structures 100 connected (or coupled) at an intersection between one or more legs in the first and/or second sets of legs 106 and 107. As also shown, each chiral structure 100 may be generally described as having the same shape and orientation of each adjacent chiral structure 100 of the spherical polygon cell 1000. As such, adjacent chiral structures 100 may generally be described as having the same direction of rotation (e.g., clockwise or counter clockwise) relative to the midpoint 112 for each respective chiral structure 100. As a result, the spherical polygon cell 1000 may exhibit auxetic properties (e.g., a negative Poisson's ratio) in multiple planes (e.g., at least three planes). In some instances, the rotation (and/or deformation) of each chiral structure 100 is restricted to a respective plane of the spherical polygon cell 1000.

As shown in FIG. 12, the spherical polygon cell 1000 may be described as having a first set of tiles 1202 and a second set of tiles 1204. As shown, the first set of tiles 1202 may be generally described as being "square" shaped and the second set of tiles 1204 may generally be described as being "triangle" shaped. As also shown, the first set of tiles 1202 generally extend along one of the great arcs 1004 and the second set of tiles 1202 generally extend within open space not occupied by the first set of tiles 1202. Therefore, the first set of tiles 1202 may generally correspond to those regions of the spherical polygon cell 1000 that include the chiral structures 100 and the second set of tiles 1204 may generally correspond to those regions of the spherical polygon cell 1000 that include the intermediary structures 1008.

Figure 13C:
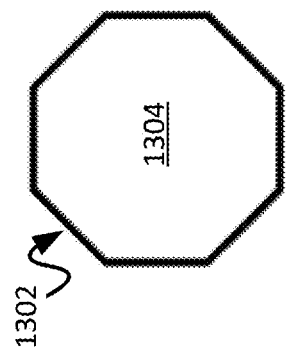
FIG. 13C is an end view of the tube-like structure of FIG. 13A, consistent with embodiments of the present disclosure.
Figure 13B:
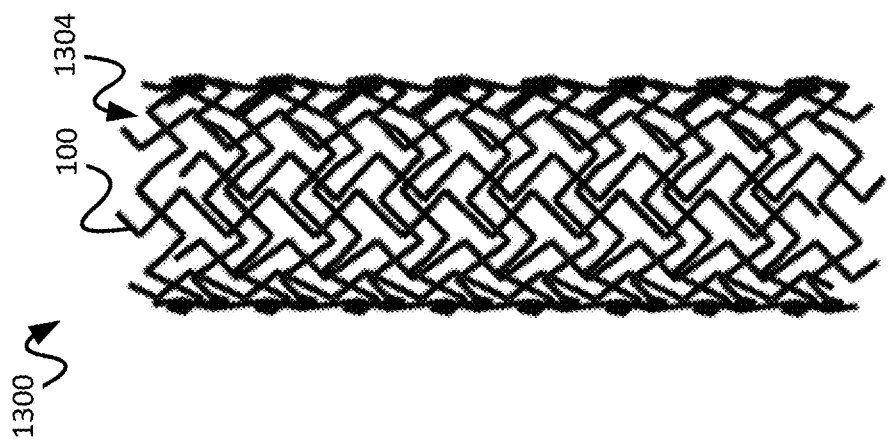
FIG. 13B is a perspective view of the tube-like structure of FIG. 13A, consistent with embodiments of the present disclosure.
Figure 13A:
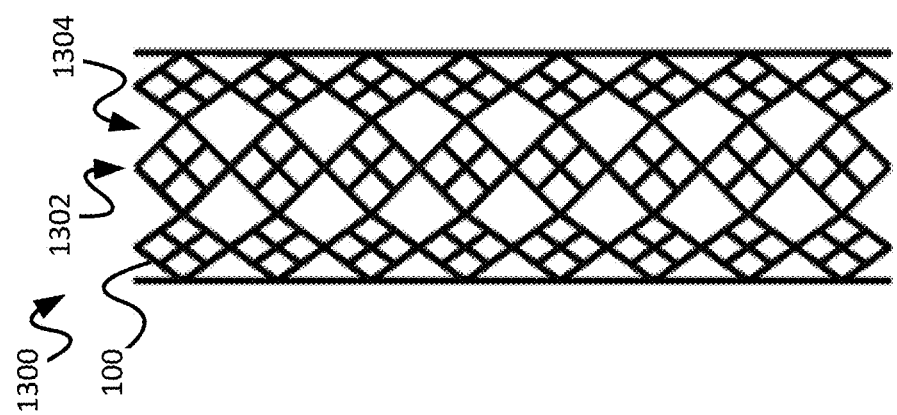
FIG. 13A is a plan view of a tube-like structure that is defined, at least in part, by the chiral structure of FIG. 1, consistent with embodiments of the present disclosure.
Figures 20A, 20B, 20C:
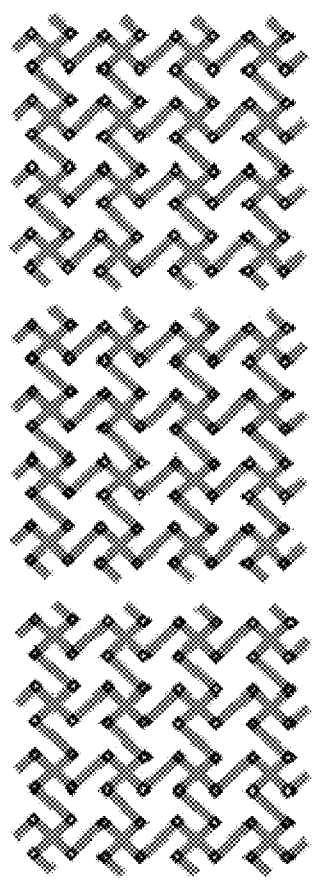
FIG. 20A shows an example of a material having chiral structures having a plurality of hinge portions that may define at least a portion of the tube-like structure of FIG. 13A, consistent with embodiments of the present disclosure.
FIG. 20B shows another example of a material having chiral structures having a plurality of hinge portions that may define at least a portion of the tube-like structure of FIG. 13A, consistent with embodiments of the present disclosure.
FIG. 20C shows another example of a material having chiral structures having a plurality of hinge portions that may define at least a portion of the tube-like structure of FIG. 13A, consistent with embodiments of the present disclosure.

FIG. 13A shows a plan view an embodiment of a tube-like structure 1300 having multiple surfaces 1302 (e.g., at least three surfaces) defined by one or more chiral structures 100. FIG. 13B shows a perspective view of the tube-like structure 1300. The tube-like structure 1300 may be generally described as at least partially enclosing a bounded volume 1304. As shown in FIGS. 13A and 13B, each of the chiral structures 100 are connected (or coupled) to chiral structures 100 defining adjacent surfaces 1302. In some instances, the chiral structures 100 may have the same direction of rotation. In other instances, the chiral structures 100 may have alternating directions of rotation. In other words, adjacent chiral structures 100 may rotate in opposite directions. The rotation of the chiral structures 100 may result in the tube-like structure 1300 exhibiting auxetic properties in response to an axial or circumferential force. For example, the tube-like structure 1300 may have a negative Poisson's ratio in both an axial and circumferential direction in response to a uniaxial force applied either circumferentially or axially.

FIG. 13B shows an end view of the tube-like structure 1300. As shown, the tube-like structure 1300 has multiple surfaces. Therefore, the tube-like structure 1300 may generally be described as an auxetic polygonal cell that at least partially encloses the bounded volume 1304. In other words, the tube-like structure 1300 may be open at one or more ends.

FIGS. 14-20 show examples of a material including a plurality of chiral structures with various geometries, orientations, and/or core cells. Each of the materials of FIGS. 14-20 may be used, for example, to define at least a portion of the tube-like structure 1300 of FIGS. 13A-13C. FIGS. 14A-14C show chiral structures having different axes of symmetry. FIGS. 15A-15C show chiral structures having varying directions of rotation. FIGS. 16A-16C shows chiral structures having different separation distances. FIGS. 17A-17C show chiral structures having core cells of different shapes. FIGS. 18A-18C show chiral structures having core cells of varying size. FIGS. 19A-19C show chiral structures having various distributions of core cells. FIGS. 20A-20C show chiral structures having one or more hinge portions, wherein the stiffness of at least one hinge portion is different from the stiffness of another hinge portion.

While the above disclosure primarily discusses the chiral structure 100 as including the first and second cross members 102 and 104 and first and second sets of legs 106 and 107, the chiral structure 100 is not limited to this configuration. For example, the chiral structure 100 may include a core cell and/or have a different geometry. Examples of core cells and/or different geometries may be found in application Ser. No. 15/248,793, filed on Aug. 26, 2016, and entitled Chiral Structures with Adjustable Auxetic Effects, which is incorporated in its entirety herein by reference.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. An auxetic periodic structure comprising:
a plurality of cuboid cells coupled to each other, each cuboid cell including a plurality of chiral structures and defining a bounded volume, wherein each chiral structure includes:
   a first cross member having a first set of distal ends;
   a second cross member intersecting the first cross member, the second cross member having a second set of distal ends;
   a first set of legs, wherein each leg of the first set of legs extends from at least one distal end of the first set of distal ends; and
   a second set of legs, wherein each leg of the second set of legs extends from at least one distal end of the second set of distal ends.

2. The auxetic periodic structure of claim 1, wherein the cuboid cells are coupled to each other using a connecting rib.

3. The auxetic periodic structure of claim 1, wherein the cuboid cells are coupled to each other through a shared chiral structure.

4. The auxetic periodic structure of claim 1, wherein the second cross member intersects the first cross member at a midpoint of the first cross member such that an equilateral cross is formed.

5. The auxetic periodic structure of claim 1, wherein the plurality of chiral structures includes at least a first chiral structure and a second chiral structure, the first chiral structure being coupled to the second chiral structure at a structure hinge portion.

6. The auxetic periodic structure of claim 5, wherein each leg of the first and second sets of legs extend from a respective one of the first or second cross members at a leg hinge portion.

7. The auxetic periodic structure of claim 6, wherein a stiffness of the first cross member and the second cross member is greater than a stiffness of the structure hinge portion and the leg hinge portion.

8. The auxetic periodic structure of claim 6, wherein a stiffness of the first set of legs and the second set of legs is greater than a stiffness of the structure hinge portion and the leg hinge portion.

9. An auxetic cuboid cell comprising:
at least six chiral structures collectively defining a bounded volume, each of the six chiral structures including:
   a first cross member having a first set of distal ends;
   a second cross member intersecting the first cross member, the second cross member having a second set of distal ends;
   a first set of legs, wherein each leg of the first set of legs extends from at least one distal end of the first set of distal ends; and
   a second set of legs, wherein each leg of the second set of legs extends from at least one distal end of the second set of distal ends.

10. The auxetic cuboid cell of claim 9, wherein the second cross member intersects the first cross member at a midpoint of the first cross member such that an equilateral cross is formed.

11. The auxetic cuboid cell of claim 9, wherein each of the six chiral structures are coupled to at least one other chiral structure of the six chiral structures at a structure hinge portion.

12. The auxetic cuboid cell of claim 11, wherein each leg of the first and second sets of legs extend from a respective one of the first or second cross members at a leg hinge portion.

13. The auxetic cuboid cell of claim 12, wherein a stiffness of the first cross member and the second cross member is greater than a stiffness of the structure hinge portion and the leg hinge portion.

14. The auxetic cuboid cell of claim 12, wherein a stiffness of the first set of legs and the second set of legs is greater than a stiffness of the structure hinge portion and the leg hinge portion.

* * * * *